United States Patent
Nikolajsen et al.

(10) Patent No.: US 12,479,949 B2
(45) Date of Patent: Nov. 25, 2025

(54) POLYMER GELS IN THE FORMATION OF POLYMER BRUSHES

(71) Applicant: RadiSurf ApS, Risskov (DK)

(72) Inventors: Jakob Pagh Nikolajsen, Hørning (DK); Amanda Andersen, Hørning (DK); Mie Lillethorup, Aarhus (DK); Mikkel Skorkjær Kongsfelt, Odder (DK)

(73) Assignee: Yield Engineering Systems, Inc., Fremont, CA (US)

( * ) Notice: Subject to any disclaimer, the term of this patent is extended or adjusted under 35 U.S.C. 154(b) by 720 days.

(21) Appl. No.: 17/721,217

(22) Filed: Apr. 14, 2022

(65) Prior Publication Data

US 2022/0242988 A1    Aug. 4, 2022

Related U.S. Application Data

(63) Continuation of application No. PCT/IB2020/059488, filed on Oct. 9, 2020.

(30) Foreign Application Priority Data

Oct. 15, 2019 (DK) .......................... PA 2019 01215

(51) Int. Cl.
C08F 292/00 (2006.01)
C08F 275/00 (2006.01)
C08F 289/00 (2006.01)

(52) U.S. Cl.
CPC .......... *C08F 292/00* (2013.01); *C08F 275/00* (2013.01); *C08F 289/00* (2013.01); *C08F 2438/01* (2013.01)

(58) Field of Classification Search
CPC ............. C08J 7/16; C08J 7/18; C08F 251/00–291/85; C08F 292/00
See application file for complete search history.

(56) References Cited

U.S. PATENT DOCUMENTS

2003/0068317 A1   4/2003  Lee
2004/0156880 A1   8/2004  Ravi
(Continued)

FOREIGN PATENT DOCUMENTS

EP    2284275    2/2011
EP    2362220    8/2011
(Continued)

OTHER PUBLICATIONS

Tomoya Sato, Gary J. Dunderdale, Chihiro Urata, and Atsushi Hozumi, Sol-Gel Preparation of Initiator Layers for Surface-Initiated ATRP: Large-Scale Formation of Polymer Brushes Is Not a Dream, Macromolecules 2018, 51, 10065-10073, American Chemical Society.

(Continued)

*Primary Examiner* — Joseph S Del Sole
*Assistant Examiner* — David L Miller
(74) *Attorney, Agent, or Firm* — Lambert Shortell & Connaughton; David J. Connaughton, Jr.; Justin P. Tinger

(57) ABSTRACT

The present invention relates to the use of polymer gels in the preparation of polymer brushes. In particular, the present invention relates to polymer gels swelled in the polymerisation medium. The invention further relates to the use of polymer gels in the formation of polymer brushes on a surface. The present invention provides improved methods for forming polymer brushes on a surface, thus, enabling easy large-scale production of polymer brush-coated surfaces. In particular, the present invention enables application of the polymerisation medium on surfaces of all geometries.

18 Claims, 16 Drawing Sheets

(56) References Cited

U.S. PATENT DOCUMENTS

| | | |
|---|---|---|
| 2012/0100217 A1 | 4/2012 | Green |
| 2014/0011162 A1 | 1/2014 | Zegarelli |
| 2017/0112970 A1 | 4/2017 | Blum |
| 2019/0100631 A1 | 4/2019 | Tsujii |

FOREIGN PATENT DOCUMENTS

| | | | |
|---|---|---|---|
| EP | 3385340 | 10/2018 | |
| WO | 2003071339 A1 | 8/2003 | |
| WO | 2005116136 A1 | 12/2005 | |
| WO | 2018/185313 | 10/2018 | |
| WO | WO-2018185313 A1 * | 10/2018 | ........... A61B 5/0031 |
| WO | 2019/131872 | 7/2019 | |

OTHER PUBLICATIONS

Demirci, Serka, Crosslinked-Polymer Brushes with Switchable Capture and Release Capabilities, Polymers 2018, 10, 956, Aug. 29, 2018.

* cited by examiner

POLYMER GELS IN THE FORMATION OF POLYMER BRUSHES

FIELD OF THE INVENTION

The present invention relates to the use of polymer gels in the formation of polymer brushes. In particular, the present invention relates to polymer gels swelled in the polymerisation medium, said swelled polymer gel applied in the formation of polymer brushes. The invention further relates to the use of polymer gels in the formation of polymer brushes on a surface. In particular, the polymer gels used in the present invention are such which are swellable in the polymerisation medium and further removable after the formation of the polymer brushes on the surface. The present invention provides improved methods for forming polymer brushes on a surface, thus, enabling easy large-scale production of polymer brush-coated surfaces as well as specific polymer brush formation. In particular, the present invention enables application of the polymerisation medium on surfaces of all geometries.

BACKGROUND OF THE INVENTION

The formation of polymer brushes is well-known. Polymer brushes are polymeric structures being tethered at one end to a substrate such as a metal, plastic or ceramic material. Using specific preparation techniques and specific monomers, it is possible to design and synthesise polymer brushes with specific properties such as chemical composition, thickness, grafting density and architecture.

In particular, polymer brushes are used for joining otherwise incompatible materials, i.e. materials which cannot readily be combined by gluing or conventional interlocking methods. A strong feature possessed by the polymer brushes is that the materials can be joined in a practically invisible manner.

Several methods for forming polymer brushes on a surface are known. When forming polymer brushes, polymerisation initiators are firstly formed on the surface onto which the polymer brushes are to be formed. Secondly, the surface is brought into contact with suitable monomers, catalysators, ligands and optionally a solvent, or suitable monomers, catalysators, ligands, an oxygen scavenger and optionally a solvent, whereby the polymer brush can form using certain reaction conditions. The polymerisation initiators and the monomers are chosen so as to suit the purposes and properties of the resulting polymer brushes. Polymer brushes may also be formed as layers of polymer brushes by repeating the polymer brush formation, e.g. using another starting monomer. This can be done due to the controlled nature of the polymerisation which leaves initiation sites at the end of the polymer brushes.

Even still, the preparation of the polymer brushes and the handling of the reagents remain a specialist task. Furthermore, production of large-scale polymer brush coated surfaces presents various difficulties, such as obtaining an even distribution of reactants on the surface onto which the polymer brushes are to be formed, and the avoidance of the reactants forming depressions on the a surface or even areas with no reactants present. Another difficulty is dealing with the evaporation of solvent during the formation process, obviously leading to products with an uneven distribution of polymer brushes. Likewise, areas without any polymer brushes at all may be an issue, leading to a polymer brush product of poor quality. To ensure a complete formation of polymer brushes on a surface, the surface may be fully immersed into the reactants, however, this approach may not be possible with larger surfaces or substrates.

Accordingly, there is a need for improving and ensuring the even distribution of the reactants for forming polymer brushes.

Polymer gels are well-known substances. Polymer gels find their use in many applications from diapers to contact lenses and implants as well as in tissue engineering. Polymer gels are three-dimensional, polymeric networks capable of absorbing large amounts of water (hydrogel) or organic solvents (organo-gel), up to 500 times their own weight. Polymer gels are obtained by cross-linking polymers into a cross-linked polymer matrix. These cross-linking sites can be divided in reversible and irreversible cross-linking. The reversible cross-linked polymer gels can be obtained from different interactions or bonds, including ionic attraction, H-bonding or metal coordination. Exposing the reversible polymer gel to certain stimuli results in breaking of the cross-links. Irreversible cross-linked polymer gels have a network of covalent bonds and produce a permanent gel network.

Polymer gels possess a number of valuable features, notably the viscoelastic response to mechanical deformation. In particular, polymer gels have been proposed for various applications such as artificial muscle, purification or separation systems, regenerative medicine, biosensors, shape memory materials, transporting systems, and molecular recognition systems. Thus, polymer gels are capable of absorbing other compounds or responding to other compounds.

Recently, hydrogels (polymer gel swelled in water) have been suggested for drug delivery due to the affinity of the hydrogels to water and thereby the possibility of sustained drug release controlled by e.g. diffusion, swelling, chemistry or environment. However, although promising, very few products have reached the market, possibly due to difficulties with releasing the drug from the hydrogel without degrading the hydrogel, thereby inducing the risk of introducing a toxic effect due to the potential hazards on human health of the degraded hydrogels. One approach has been to synthesise drug delivery hydrogels which are enzymatically degradable to avoid accumulation of the hydrogel in body.

Hydrogels have been combined with polymer brushes in the form of polymer brush-gels, see S. Demirci, Polymers 2018, 10, 956. Crosslinkers react or combine with the brush-forming monomers to form a brush-gel (or cross-linked polymer brush network), from which other compounds can be released (exemplified by methylene blue). In S. Demirci, cylodextrin is incorporated as crosslinker into a polymer, e.g. poly(2-N-morpholinoethyl methacrylate), yielding a crosslinked cyclodextrin methacrylate (CDMA) polymer on a silicon wafer. The CDMA polymer is subsequently used to reversibly capture/release methylene blue from the brush-gel.

Accordingly, although hydrogels are widely used in many applications, and polymer gels may find likewise applications, they possess some drawbacks as a medium for creating polymer brushes. E.g., depending on the polymer gel, the polymer brush reactants may be absorbed by the polymer gel, thereby preventing migration of the reactants to the interphase resulting in poor formation of polymer brushes. Furthermore, cross-linking sites on the polymer gel may react with the polymer brush reactants and adversely influence the polymer brush formation. Still yet, some cross-linking sites may act as radical scavengers, and thereby affect polymer brush formation. Additionally, some cross-linking site may act as a metal coordinator, meaning that the metal catalyst utilised in the polymerisation might be absorbed, thereby distorting the polymerisation process.

Despite the above, hydrogels have been used with polymer brushes. From EP 3 385 340 A1, a coating of a hydrogel layer of a polysaccharide and a polymer brush layer is known. The coating is prepared by a) providing a hydrogel layer on a substrate, b) attaching initiators having a radically transferable atom on the hydrogel layer, and c) reacting monomers with the initiators to form polymer brushes attached to the hydrogel layer. Thus, the hydrogel become an integrated part of the polymer brushes and the hydrogel is functionalized with polymer brushes.

The inventors of the present invention have surprisingly found that certain polymer gels are able to promote even distribution of polymerisation reactants and even promote polymer brush formation.

SUMMARY OF THE INVENTION

The present invention relates to the formation of polymer brushes. In particular, the invention relates to the use of a polymer gel in the formation of polymer brushes. The polymer gel used in the present invention is swellable in the polymerisation medium and removable following the formation of the polymer brushes on the surface. Thus, the polymer gel acts as a "container" for the polymerisation medium comprising the reactants needed for forming (or growing) of polymer brushes. The polymer gel provides a number of advantages, including easy application of the reactants needed for polymer brush formation. The polymer gel, when swelled in the polymerisation medium, has a dense structure, which allows for better contact between the polymerisation medium and the surface onto which the polymer brushes are to be formed. Furthermore, the polymer gel as well as excess polymerisation medium may easily be removed from the surface after polymer brush formation. Accordingly, the polymer gel does not react with optional functional groups immobilised onto the surface or the components of the polymerisation medium, leaving pure polymer brushes after cleaning off the polymer gel.

Thus, in a first aspect, the present invention relates to a method for forming polymer brushes on a surface, whereby a surface having polymerisation initiators immobilised thereon is brought into contact with a polymerisation medium, in which method a swellable and removable polymer gel is used during the formation of the polymer brushes. A major advantage of using a polymerisation medium in combination with a polymer gel is that the polymer gel swells in the polymerisation medium, and the polymer gel thereby provides a semi-solid or dense carrier for the polymerisation medium, and thereby a carrier for the polymer brush-forming components of the polymerisation medium. This enables formation of polymer brushes on surfaces of all geometries and orientations as the swelled polymerisation medium adheres to the surface during the polymerisation reaction. Another advantage is that the polymer gel slows the migration of oxygen from the surrounding atmosphere to the polymer gel-surface interphase, which gives higher degree of control of the polymerisation reaction creating the polymer brushes.

Thus, the present invention relates in particular to a method, wherein the polymer gel is swellable in the polymerisation medium, and wherein the polymer gel is removable following formation of polymer brushes on the surface.

Traditionally, polymer brushes are formed in dip-coating processes, thus, limiting the formation of polymer brushes on larger or more complex structures. In the present invention, the polymerisation reaction can proceed easily without the need for the surface/structure to be fully immersed in the polymerisation medium. A further advantage of the invention is that the formation of polymer brushes can be directed at specific sites only, whereas the traditional dip-coating may result in unwanted polymer brush formation, if immobilised initiators are present at all sites on the surface/structure.

In a second aspect, the present invention relates to the use of a swellable and removable polymer gel in the formation of polymer brushes. Again, the polymer gel is swellable in the polymerisation medium and removable after the formation of the polymer brushes. The use of a polymer gel provides an even distribution of the polymerisation medium on a surface having polymerisation initiators immobilised thereon. The use of a polymer gel has the advantageous effect that the polymer gel becomes swelled in the polymerisation medium, whereby the swelled polymerisation medium (swelled gel) can easily be applied to surfaces with complex geometries and various orientations as the swelled polymerisation medium (swelled gel) adheres better to the surface.

It has surprisingly been found that the swelling of the polymer gel in the polymerisation medium does not hinder the polymerisation reaction (i.e. the formation of polymer brushes on the surface).

DESCRIPTION OF THE DRAWINGS

The invention will become more fully understood from the detailed description given herein. The accompanying drawing are given by way of illustration only, and, thus, are not limitative of the present invention. In the accompanying drawing.

DETAILED DESCRIPTION OF THE INVENTION

Figure 1:
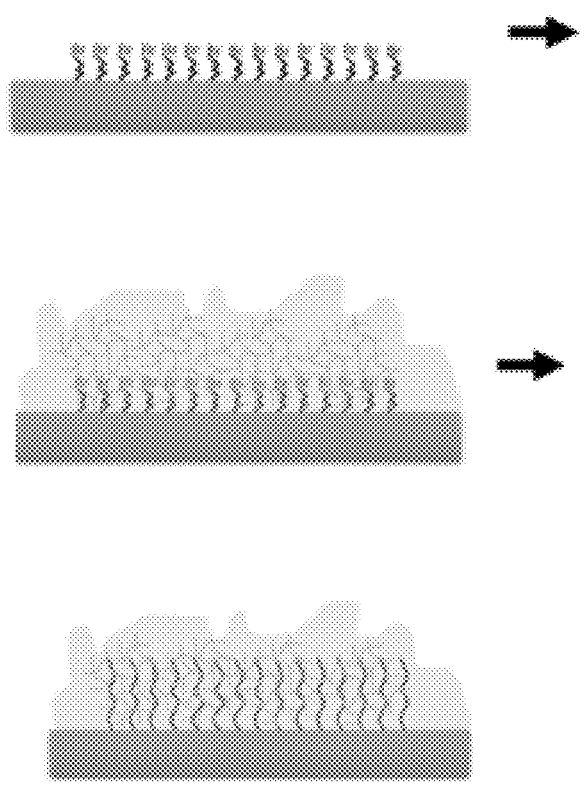
FIG. 1 shows the method of the present invention, where a surface having polymerisation initiators immobilised thereon (first step) is brought into contact with a polymer gel swelled in a polymerisation medium (second step), and the progression and formation of the polymer brushes from the polymerisation initiators (third step).

The invention and its aspects are described in more detail in the following.

The invention relates to a method for forming polymer brushes on a surface, wherein a surface having polymerisation initiators immobilised thereon is brought into contact with a polymerisation medium, in which method the polymer gel is swelled in the polymerisation medium during the formation of the polymer brushes. The polymer gel is removable from the surface following formation of the polymer brushes.

Within the present context, the expressions "a polymer gel" and "the polymer gel" are intended to comprise one or more polymer gels. More than one polymer gel may suitably be two, three, four or five polymer gels.

The polymer gel to be applied in the present invention is suitably swellable in water, in a mixture of water and an alcohol, in a mixture of water and an aprotic solvent, or in an aprotic solvent besides the polymerisation medium.

In a preferred embodiment of the present invention, the polymer gel is such where the cross-linking of the polymer gel is reversible. Thus, the swelling of the polymer gel in the polymerisation medium (swelled gel) may be reversed by external stimuli.

The polymer gels to be used in the present invention, are such which are able to absorb the organo/water solvent system used in the polymerisation medium. The polymer gel to be used in the present invention is suitably reversible polymer gels, i.e. polymer gels which can be altered between the gelated form and the liquid form. In particular, the polymer gels to be used in the present methods may be hydrogels. Suitable polymer gels have a single network (one type of polymer and cross-link) or a double network (two types of polymer and cross-link) and are reversibly cross-linked polymer gels. Examples of suitable polymer gels include, but are not limited to, polyallylamine (PAH), poly (phosphoric acid 2-hydroxyethyl methacrylate ester), polyvinyl imidazole, polyacrylic acid, PEG, collagen, gelatin, agarose, and polysaccharides such as chitosan, cyclodextrins (e.g. a combination of beta-CD polymer and a PEG-cholesterol polymer), alginate, sodium alginate, and xanthan gum as well as cysteine-based polymer gels. It is anticipated that xanthan gum is a very suited polysaccharide for use as polymer gel for the purpose of the present invention. The cross-linker for forming cross-linked polymer gels may be incorporated as part of the polymer gel or added as an additive to the system.

In one embodiment, the polymer gel has metal chelating sites, whereby metal coordination is possible. Incorporation of a molecule containing a metal chelating moiety, such as tannic acid (TA), may provide cross-linking of the polymer by coordination of metal ions e.g. $Cu(II)$, $Fe(III)$ and $Al(III)$.

In another embodiment, the cross-linking of the polymer gel relies on hydrophobic interactions. Cross-linking is e.g. achieved by either guest-host interactions (e.g. cyclodextrin with small hydrophobic molecule).

In another embodiment, the cross-linking of the polymer gel relies on sulphur bridges. Cross-linking is here made out by disulphide bonds, created internally in one polymer (e.g. poly-cysteine).

In another embodiment, the polymer gel has hydrogen bond acceptors and/or donors, whereby cross-linking is facilitated by hydrogen bonding. Examples of this are gelatin and agarose, which are conveniently also thermoresponsive polymer gels.

The polymer gel to be used in the present invention is preferably reversibly cross-linked. The reversibility is obtained by a responsiveness to an external cue such as pH, temperature, light exposure, sonication, solvent polarity or oxidation potential. An example of pH responsive polymer gel is PAH/TA/Fe(III) polymer gel (hydrogel). At lower pH (below 7), the polymer gel is in a liquid form, and at a higher pH (7 or higher), the polymer gel is dense or semi-solid. Another example is the hydrogel of poly(phosphoric acid 2-hydroxyethyl methacrylate ester), which gelates at high pH but liquifies upon ultrasonication in water (or at low pH). In particular, the swelled polymer gel may be removable by adjustment of pH or temperature, by light exposure, or by changing the polarity of the solvent mixture. In some methods, sonication is performed in a suitable solvent, optionally as a series of rinsing steps.

An example where cross-linking is facilitated by hydrophobic interaction is cyclodextrins, which are incorporated into the site chain of one polymer. Another polymer is then designed to have a hydrophobic moiety. Gelation is obtained by mixing these two polymers in a hydrophilic environment. Due to energetic considerations the hydrophobic moiety will be attracted to the hydrophobic interior of the cyclodextrins and thus facilitate cross-linking. Reversing this bond can be done by changing to a solvent of another polarity.

After swelling of the polymer gel in the polymerisation medium, the resulting medium (gel) is transferred to the surface onto which the polymer brushes are to be formed.

In general, the formation of the polymer brushes takes place at room temperature, however, it is to be understood that other temperatures may also be applied. The temperature may in particular be related to the method used to form the polymer brushes. In addition, elevated temperatures may be utilised after the polymer brush formation as stimuli to liquify and thereby easily remove the polymer gel.

In general, polymer brushes are synthesised by SIP (Surface-Initiated Polymerisation). Examples of suitable methods for forming polymer brushes include the ARGET ATRP (Activators ReGenerated by Electron Transfer Atom Transfer Radical Polymerisation) method, the conventional ATRP method, the SARA ATRP (Supplemental Activation Reducing Agent Atom Transfer Radical Polymerisation) method, and the SET LRP (Single-Electron Transfer Living Radical Polymerisation) method. These methods are well-known in the art. Several methods are described in WO 2019 196999 A1.

The ATRP method usually employs a transition metal complex as the catalyst with an alkyl halide as the polymerisation initiator (R-X), and the radicals are generated through an atom transfer process. At the same time, the transition metal is oxidised to a higher oxidation state. The result is a growing polymer chain from monomers. The ATRP method requires the following reactants: monomers, (solvent), initiators (immobilised on the surface onto which the polymer brush is grown), catalyst and ligand. In the ARGET ATRP method, activators are regenerated by electron transfer using reducing agents such as hydrazine, phenols, sugars and ascorbic acid for regeneration of Cu(I). In SARA ATRP, Cu(0) is sued as supplemental activator and reducing agent, where Cu(0) activates alkyl halide directly, and Cu(0) additionally reduces Cu(II) to Cu(I), whereby the Cu(I) activator is regenerated. In the SIP method, the immobilised polymerisation initiators are activated by a catalyst in the presence of monomers, and polymer brushes are formed on the surface. The SET-LRP, similar to the ATRP, ARGET ATRP, and SARA ATRP, utilises an alkyl halide as an initiator. In the presence of monomer, (solvent), and ligand, the polymerisation is catalysed by a catalyst, which stems from a bulk portion of Cu(0) constantly supplying Cu(0) as catalyst.

All the above-mentioned methods are suitable for preparing polymer brushes on a surface. These and other, not specifically mentioned herein, methods for forming polymer brushes on a surface may be equally suited for the purposes of the present invention.

The reaction conditions, such as temperature, reaction time, washing etc. are generally known to the person skilled in the art. Likewise, the person skilled in the art will, depending on the polymer brush formation method, know how to select the polymerisation medium, i.e. monomers, catalysts/ligands, solvents and the like necessary for the polymer brushes to form.

In general, the polymerisation medium to be used in the present method comprises a solvent or combination of solvents, monomers, a ligand, a catalyst, and/or an activator. In some cases, it may be advantageous to add the activator to the polymer gel, before swelling of the polymer gel and the polymerisation medium. Thereby, the reactants of the polymerisation medium are only activated, when the polymer gel and the polymerisation medium are combined. In some cases, anticaking agent such as sodium bicarbonate or silicon dioxide can be used to ensure even gelation of polymerisation medium. In some cases, surfactants such as anionic, zwitterionic or non-ionic surfactants can be used to ease the distribution of the polymerisation medium with the polymer gel.

In the present invention, suitable solvents include alcohols such as methanol, ethanol, and isopropanol. Aprotic solvents such as dimethyl sulfoxide (DMSO), acetone, dimethylformamide, tetrahydrofuran, propylene carbonate, methylene carbonate, ethylene carbonate, ethyl lactate alcohol, and ionic liquids (salts dissolved in a liquid) may also be used in the present method. The alcohol and/or aprotic solvent is suitably mixed with water in a suitable ratio, e.g. Water and alcohol are suitably mixed in a ratio of 5 vol-%:95 vol-%, 10 vol-%:90 vol-%, 15 vol-%:85 vol-%, 20 vol-%:80 vol-%, 25 vol-%:75 vol-%, 30 vol-%:70 vol-%, 35 vol-%:65 vol-%, 40 vol-%:60 vol-%, 45 vol-%:55 vol-%, 50 vol-%:50 vol-%, 55 vol-%:45 vol-%, 60 vol-%:40 vol-%, 65 vol-%:35 vol-%, 70 vol-%:30 vol-%, 75 vol-%:25 vol-%, 80 vol-%:20 vol-%, 85 vol-%:15 vol-%, 90 vol-%:10 vol-%, or 5 vol-%:95 vol-% alcohol/aprotic solvent:water. In a preferred embodiment, the ratio is 50 vol-%:50 vol-% alcohol/aprotic solvent:water.

Examples of suited monomers include, but are not limited to, acrylates, meth-acrylates, halogen-substituted alkenes, acrylamides, methacrylamides, and styrenes, as well as mixtures thereof. Specific acrylate monomers include, but are not limited to, methyl acrylate, and ethyl acrylate, lauryl acrylate. Specific methacrylate monomers include, but are not limited to, methyl methacrylate (MMA), 2-hydroxyethylmethacrylate (HEMA), glycidyl methacrylate (GMA), ethyl methacrylate, and butyl methacrylate, lauryl methacrylate. Specific halogen-substituted alkene monomers include, but are not limited to, vinyl chloride, vinylidene difluoride, tetrafluoroethylene, chlorotrifluoroethylene, and hexafluoropropylene. Specific acrylamides monomers include, but are not limited to, acrylamide, N-isopropylacrylamide, N-tert-butylacrylamide, and N-hydroxyethyl acrylamide. Specific methacrylamide monomers include, but are not limited to, N-isopropylmethacrylamide, methacrylamide, N-tert-butyl-methacrylate, and N-hydroxyethyl methacrylate. Specific styrene monomers include, but are not limited to, styrene, 4-methylstyrene, 2,3,4,5,6-penta-fluorostyrene, p-divinylbenzene, and 4-chlorostyrene.

Examples of suited ligands include, but are not limited to, nitrogen-containing ligands, such as N,N,N',N'',N'''-pentamethyldiethylenetriamine (PMDETA), tris-[2-(dimethylamino)ethyl]amine ($Me_6TREN$), tris(2-aminoethyl)amine (TREN), tris(2-pyridylmethyl)amine (TPMA), and 2,2'-bipyridil (BiPy).

Examples of suited catalysts include, but are not limited to, metal catalysts derived from copper (Cu), iron (Fe), and nickel (Ni). In particular, Cu may be suited.

Examples of suited activators include, but are not limited to, sodium ascorbate (NaAsc), ascorbic acid (Asc), hydrazine, hydrazine hydrate, sodium hypo-phosphite, a mixture of iron powder and sodium chloride, hydrogen carbonate, citric acid, and pyrogallic acid, as well as mixtures thereof. In particular, NaAsc, Asc, and hydrazine are suited for the purposes of the invention.

In the method of the invention, polymer brushes are formed on the surface, typically on a surface of a solid material. Such surface may suitably be made from metal (e.g. aluminium, steel, titanium, nickel, gold, silver, platinum, chrome, copper, iron, and alloys of various metals), glass, carbon, carbon fibres, graphene or graphite, ceramics, composite, or plastics, rubber, or other materials comprising an outer coating of such materials. The surface may be electrically conducting or non-conducting. The surface has immobilised thereto, polymerisation initiators. Methods of immobilising polymerisation initiators are well-known in the art. The polymerisation initiators can be made with a predefined surface chemistry so as to enable immobilisation onto the surface, depending on the material of which the surface is made, but also depending on the characteristics of the polymer brush to be formed.

The concentration of each of the components (monomer, ligand, catalyst, activator) is typically in the range of from 0.1 nM to 35 M. Specific examples include, but are not limited to, 1 nM, 5 nM, 10 nM, 50 nM, 1 M, 5 M, 10 M, 20 M, and 30 M. It is to be understood that the concentration of each of the components may be the same or may be different. In certain embodiments, the monomer concentration may be from 0.01 M to 5 M. In certain embodiments, the concentration of the activator may be from 0.010 to 0.045 M. In a certain embodiment, the concentration of the ligand is 0.05 mM to 0.1 M. In a certain embodiment, the concentration of the solvent is from 0.1 to 35 M. In certain embodiments, the concentration of the catalyst is from 1.0 ppb to 500.0 ppm.

In a preferred embodiment of the present invention, the polymer gel is a reversible cross-linked polymer gel. Such reversible polymer gel may suitably be composed primarily of polymers having a certain cross-linker either incorporated into the polymer side chain or added as an additive (e.g. tannic acid) to the polymer gel solution. These cross-linkers may suitably be metal coordinating and can be achieved using e.g. a pyrogallol (tannic acid) structure. The choice of metal coordination is important, since unwanted coordination off the metal to the metal coordination sites could distort the polymerisation reaction and, thus, the formation of polymer brushes. Suited polymer gels are such which swell in the polymerisation medium.

In another embodiment of the present invention, the polymer gel is thixotropic. Xanthan gum is a suited example of a thixotropic polymer gel.

In the method of the invention, the polymer gel is swelled in the polymerisation medium. After the swelling, the final polymerisation medium typically comprises 0.1-20 weight-% polymer. The swelled gel is then applied to the surface onto which polymerisation initiators are immobilised. The swelled gel may suitably be brushed/painted, laid, or poured onto the surface. Then, the polymerisation and the formation of polymer brushes are allowed to progress.

The surface and the swelled gel (combined polymer gel and polymerisation medium) are typically kept in contact with each other for a suitable period of time, such as from 0.1 seconds to 5 hours. The suitable period of time includes, but are not limited to, 1 second, 2 seconds, 30 seconds, 1 minute, 5 minutes, 30 minutes, 1 hour, 2 hours, 3 hours, 4 hours and 5 hours. The polymer brush formation may take place at ambient temperature (room temperature), or with cooling or heating. Suitable reaction temperatures are such from −20° C. up to 120° C., such as from room temperature (approximately 20° C.) to 120° C. Specific temperatures include, but are not limited to, −20° C., 0° C., room temperature (approximately 20° C.), 30° C., 50° C., 60° C., 70° C., 80° C., 90° C., 100° C., 110° C., and 120° C.

After formation of the polymer brushes, the swelled gel is withdrawn from the surface. This may suitably be done by ultrasonication of the surface, optionally in an acidic environment. An example of a pH responsive polymer gel is the PAH/TA/Fe(III) which is in a liquid phase around pH 7 and below, and in a gel state above pH 7. Submersing the polymer gel into an acidic solution such as a HCl solution, changes the metal coordination and thereby the viscosity of the gel to yield a liquid. When the gel is in the liquid state, it can easily be removed from the polymer brushes by e.g. ultrasonication.

It has been shown that using a polymer gel for polymer brush formation, a number of advantages are achieved. The polymer gel provides a stable environment for the polymer brush formation as the polymer gel functions as a container for the polymerisation medium, thus, the polymerisation medium can freely diffuse within the polymer gel and promote polymer brush formation at the surface. The polymer gels furthermore provide a viscous environment, thereby enabling formation of polymer brushes on surfaces that are not planar oriented (not horizontal positioned) during polymer brush formation or enabling formation of polymer brushes on surfaces where a specific polymer brush formation is desired. Furthermore, using a polymer gel during the polymer brush formation, the supply of oxygen is minimised during the polymer brush formation, thereby ensuring a controlled polymerisation. These advantages further enable large-scale production of polymer brush-coated surfaces.

Thus, the present invention further relates to the use of a polymer gel in the formation of polymer brushes for evenly distributing a polymerisation medium on a surface having polymerisation initiators immobilised thereon. The polymer gel and how to use it in the formation of polymer brushes is described above.

The use according to the invention comprise swelling of the polymer gel in the polymerisation medium.

The polymer brushes are valuable in a number of applications, including the bonding of rubbers, composites, and plastics to metals and glasses as well as bonding between such for sealing applications, bonding of functional thermoplastics to glass for sensor applications, efficient bonding of polymer brush coated composite fillers, like carbon fibres, graphene, particles etc. into the matrix of a polymer, e.g. a thermoplastic material, for creating functional surfaces, e.g. antibacterial surfaces, low friction surfaces or super hydrophobic self-cleaning surfaces on glass, metal, plastic etc.

The present invention is further illustrated by the following non-limiting examples.

EXAMPLES

Example 1

Preparation of Catalyst/Me6TREN Solution for Polymerisation Medium.

A catalyst/Me6TREN solution (polymerisation medium without oxygen scavenger activator and monomer) was prepared the following way:

250 m DI-water (deionised water) and 2.40 ml N Tris[2-(dimethyl-amino)ethyl]amine (Me6TREN—acting as ligand) were mixed in an round bottom flask with a Cu-wire wrapped teflon magnet. The solution was stirred for 8 days, thereby liberating Cu(0) into the solution. Cu(0) functions as a dormant/inactive catalyst, which can be activated upon addition of an activation agent. UV-vis spectroscopy was used to determine the Cu(0)-catalyst concentration. The Cu-catalyst/Me6TREN stock solution was diluted by water to obtain a catalyst concentration of 73 mg/l, 93.8 mg/l, 333 mg/l, or 427 mg/l.

Example 2

Preparation of Catalyst/PMDETA Solution for Polymerisation Medium.

A catalyst/PMDETA stock solution (polymerisation medium without polymerisation activator) was prepared the following way:

2000 ml DI-water (deionised water) and 44 ml N,N,N',N'',N''-pentamethyl-diethylenetriamine (PMDETA—acting as ligand) were mixed in an Erlenmeyer flask. Using a peristaltic pump and silicon tubes, the solution was flowed through a Cu-tube (length 10 m, inner diameter 2.8 mm, outer diameter: 4 mm) with a flow rate of 10 ml/min. Thereby, Cu(0) is liberated into the solution. Cu(0) functions as a dormant/inactive catalyst, which can be activated upon addition of an activation agent. UV-vis spectroscopy was used to determine the Cu(0)-catalyst concentration. Thereafter, the Cu-catalyst/PMDETA stock solution was diluted with DI-water to obtain a catalyst concentration of approximately 30 mg/l.

Example 3

Preparation of a pH Responsive Polymer Gel: Poly(Phosphoric Acid 2-Hydroxy-Ethyl Methacrylate Ester)

2.27 g phosphoric acid 2-hydroxyethyl methacrylate ester (monomer) was combined with 8 ml catalyst/PMDETA stock solution from Example 2 and 10 μL ethyl alpha-bromoisobutyrate (initiator). The solution was purged with argon for 5 minutes. 32.7 mg sodium ascorbate (NaAsc, activator) was added and the solution was purged for additional 5 minutes. The reaction was left to react overnight. The polymer was isolated by suction filtration and briefly washed with water followed with ethanol. This cleaning process e.g. removes excess NaAsc. Thereby, the non-swelled polymer gel, poly(phosphoric acid 2-hydroxyethyl methacrylate ester), was obtained.

Example 4

Formation of Polymer Brushes Using the Polymer Gel, Poly(Phosphoric Acid 2-Hydroxyethyl Methacrylate Ester).

Polyacrylamide brushes were formed by swelling the poly(phosphoric acid 2-hydroxyethyl methacrylate ester) gel (prepared in Example 3) in a polymerisation medium for creating polyacrylamide brushes and applying the resulting gel to a surface having polymerisation initiators immobilised thereon, cf. below.

Firstly, the polymerisation medium (without oxygen scavenger as activator) was prepared by mixing 4 ml DI-water, 50 μl Me6TREN/catalyst stock solution (prepared in Example 1) and 0.29 g acryl amide. Secondly, the polymer gel was swelled in the polymerisation medium by dissolving 195.5 mg poly(phosphoric acid 2-hydroxyethyl methacrylate ester) of Example 3 in 1 ml of the polymerisation medium by ultrasonication for 5 minutes. At this stage, the polymer gel solution combined with the polymerisation medium was acidic, and hence was in its liquid form. To gellate the polymer gel, pH of the solution was increased to above pH 7 by adding a NaOH solution. Notably, by adding the oxygen scavenger activator NaAsc (sodium ascorbate) combined with the NaOH solution, the polymerisation medium was at the same time activated to enable the polymer brush formation. Hence, 10.2 mg NaAsc was added to 1 ml 1M NaOH, and this solution was added to the solution of the polymer gel in the polymerisation medium.

Figure 2:
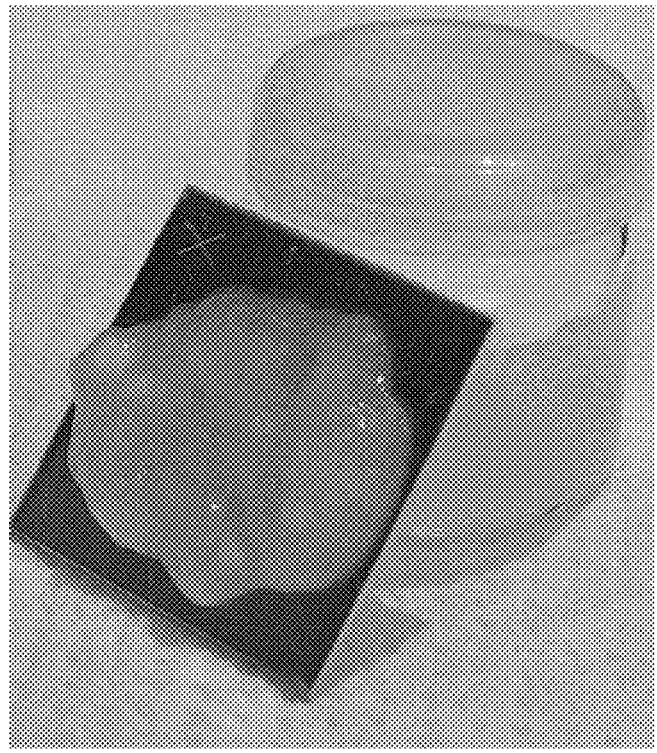
FIG. 2 shows the method of the present invention, where a surface is brought into contact with a polymer gel swelled in a polymerisation medium (cf. Example 4) and further that the medium is able to adhere to the surface even when tilted vertically during 1 hour of polymerisation.

The polymer gel (mixed with the polymerisation medium) started to gellate within 3 minutes. A pea-sized gel piece was placed on a 25×25 mm aluminium plate having polymerisation initiators (3-(trimethoxysilyl)propyl 2-bromo-2-methylpropanoate deposited on aluminium) immobilised thereon. The swelled polymerisation medium (combination of polymerisation medium and polymer gel) was smeared out on the plate. This is shown in FIG. 2. As can be seen from FIG. 2, the adherence of the swelled gel (swelled polymerisation medium) to the plate is excellent, and even when tilted vertically as shown, the gel remained in its place.

The polymer gel swelled in the polymerisation medium was left to create polymer brushes on the surface for 1 hour at room temperature. Afterwards, the polymer gel/polymerisation medium was cleaned off by ultrasonication of the plate in water for 10 minutes. The ultrasonication "dissolved" the swelled polymer gel, i.e. became liquid (the swelled gel was reversible). Afterwards the plate was cleaned by ultrasonication for 10 minutes in acetone to remove any physiosorbed material.

Figure 3:
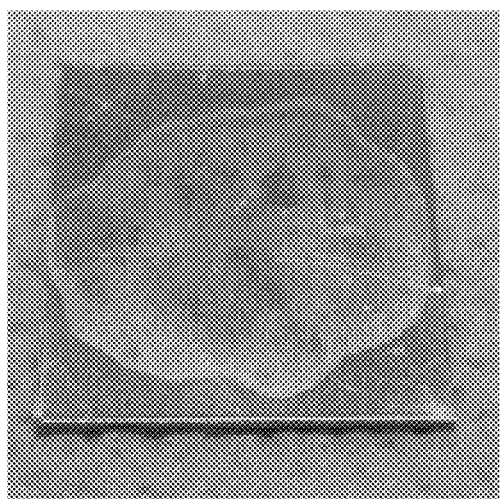
FIG. 3 shows visually a homogeneous polymer brush film only where the polymer gel swelled in the polymerisation medium was placed on the surface (sample of FIG. 2 after 1 hour). Along the edges, the aluminium samples still only have initiators immobilised and no polymer brushes formation.

The formation of a homogenous polymer brush coating was seen only in the area where the polymer gel/polymerisation medium had been in contact with the surface (confirmed visually and shown in FIG. 3). The distinction between the two different areas was also confirmed by water contact angle measurement.

Example 5

Formation of Polymer Brushes Using the Polymer Gel, Poly(Phosphoric Acid 2-Hydroxyethyl Methacrylate Ester) on Large Stainless Steel Substrate.

This example is similar to the preceding Example 4 in that polyacrylamide brushes were formed by swelling the poly (phosphoric acid 2-hydroxyethyl methacrylate ester) gel (polymer gel, prepared in Example 3) in a polymerisation medium for creating polyacrylamide brushes and applying the resulting gel to a surface having polymerisation initiators immobilised thereon, cf. below. However, in this example the method was applied to a large stainless-steel plate to demonstrate the scalability of the method.

Firstly, the polymerisation medium (without oxygen scavenger as activator) was prepared by mixing 4 ml DI-water, 50 μl Me6TREN/catalyst stock solution (prepared in Example 1) and 0.31 g acryl amide. Secondly, the polymer gel was swelled in the polymerisation medium by dissolving 603 mg poly(phosphoric acid 2-hydroxyethyl methacrylate ester) of Example 3 in 2 ml of the poly-merisation medium by ultrasonication for 5 minutes. At this stage the polymer gel solution combined with the polymerisation medium was acidic, and hence was in its liquid form. To gellate the polymer gel, pH of the solution was increased to above pH 7 by adding a NaOH solution. Notably, by adding the oxygen scavenger activator NaAsc combined with the NaOH solution, the polymerisation medium was at the same time activated to enable the polymer brush formation.

Hence, 11.9 mg NaAsc was added to 2 ml 1 M NaOH, and this solution was added to the solution of the polymer gel in the polymerisation medium.

Figure 4:
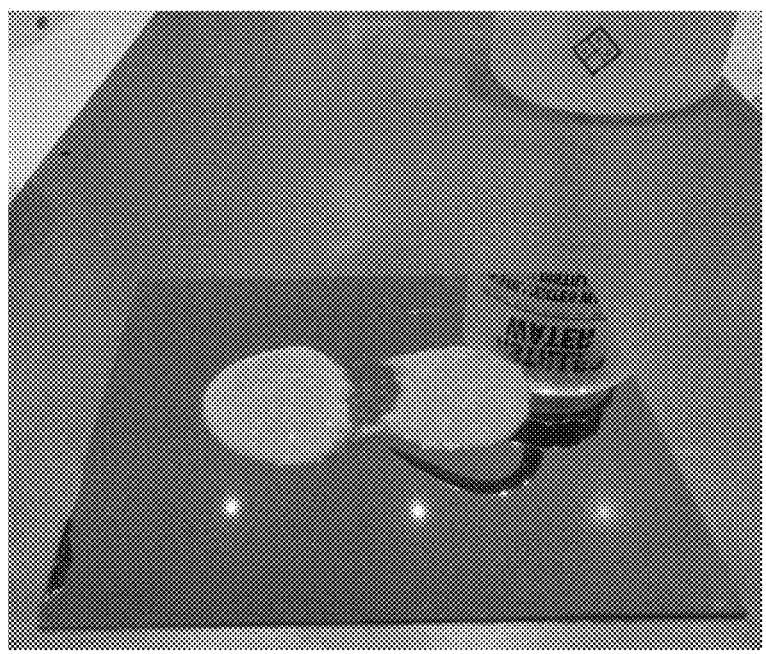
FIG. 4 shows the swelled polymer gel of Example 5 smeared out on a 10 cm×10 cm stainless steel plate.

The polymer gel (mixed with the polymerisation medium) started to gellate within 3 minutes. The gel was placed on a 100×100 mm stainless steel plate having polymerisation initiators (3-(trimethoxysilyl)propyl 2-bromo-2-methyl-propanoate deposited on stainless steel) immobilised thereon. The polymer gel swelled in the polymerisation medium was smeared out on parts of the plate. This is shown in FIG. 4.

The swelled polymerisation medium/polymer gel was left to react for 1 hour at room temperature. Afterwards, the polymer gel/polymerisation medium was cleaned off by ultrasonication of the plate in water for 10 minutes. The ultrasonication "dissolved" the swelled polymer gel, i.e. became liquid (the swelled gel was reversible). Afterwards the plate was cleaned by ultrasonication for 10 minutes in acetone to remove any physiosorbed material.

Figure 5:
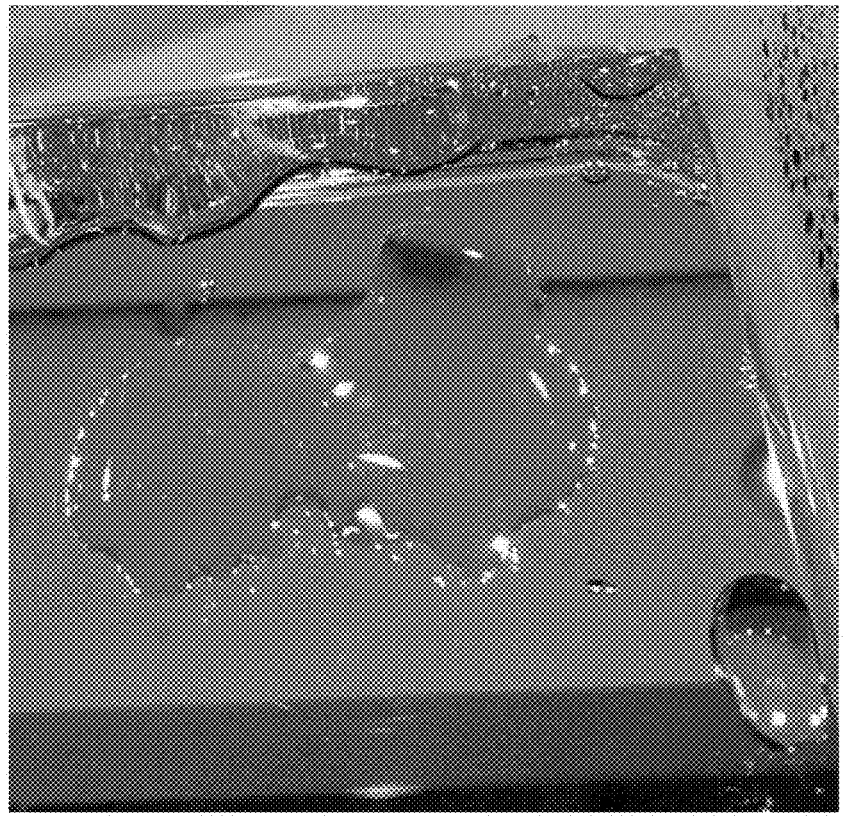
FIG. 5 shows the sample after polymerisation and cleaning has been carried out, cf. Example 5.

The formation of a homogenous polymer brush coating was seen only in the area where the swelled polymerisation medium had been in contact with the surface. This was confirmed by applying water to the surface and observing that the surface was wetted in the coated area only as shown in FIG. 5. The distinction between the two different areas was also confirmed by water contact angle measurement.

Example 6

Formation of Polymer Brushes Using the Polymer Gel, PAH/TA/Fe(III).

Poly(glycidyl methacrylate) brushes were formed by swelling the PAH/TA/Fe(III) polymer gel in the polymerisation medium for creating poly(glycidyl meth-acrylate) brushes. PAH was purchased (in contrast to poly(phosphoric acid 2-hydroxyethyl methacrylate ester) used in Examples 3 and 4, which was synthesised).

Firstly, the polymerisation medium was prepared by mixing 172 µl DI-water, 172 µl EtOH, 100 µl PMDETA/catalyst stock solution (prepared in Example 2) and 52 µl glycidyl methacrylate. Secondly, the PAH/TA/Fe(III) polymer gel was prepared by mixing 0.5 ml 40% PAH in water, 15.9 mg tannic acid and 0.17 ml 0.00865 M FeCl3 in DI-water. Thirdly, the polymerisation medium and the polymer gel were combined, giving a dark blue solution. At this stage the polymer gel combined with the polymerisation medium was acidic, and hence was in its liquid form.

To gelate the polymerisation medium combined with the polymer gel (i.e. the swelled polymerisation medium/polymer gel), pH of the solution was increased to above pH 7 by adding a NaOH solution. By adding the oxygen scavenger polymerisation activator NaAsc combined with the NaOH solution, the polymerisation medium was at the same time activated to enable the polymer brush formation. Hence, 5.5 mg NaAsc was added to 0.33 ml 1 M NaOH, and this solution was added to the combined polymer gel and polymerisation medium. This yielded a dark red, dense solution as the polymer gel was swelled in the polymerisation medium, thus, forming the polymer gel containing the polymerisation medium.

Figure 6:
FIG. 6 shows the swelled polymer gel of Example 6.

The swelled polymer gel/the polymerisation medium was placed on a 25×25 mm aluminium plate having polymerisation initiators (3-(trimethoxysilyl)propyl 2-bromo-2-methylpropanoate deposited on aluminium) immobilised thereon. This is shown in FIG. 6.

After the polymerisation for 1 hour, the plate with the swelled polymer gel is submersed in 0.01 M HCl and sonicated for 10 minutes. The acidic pH was the stimuli to "dissolve" the swelled polymer gel, i.e. the medium became liquid (the swelling was reversible). Afterwards, the plate was ultrasonicated for 10 minutes, first in water and afterwards in acetone to remove any physiosorbed material.

Figure 7:
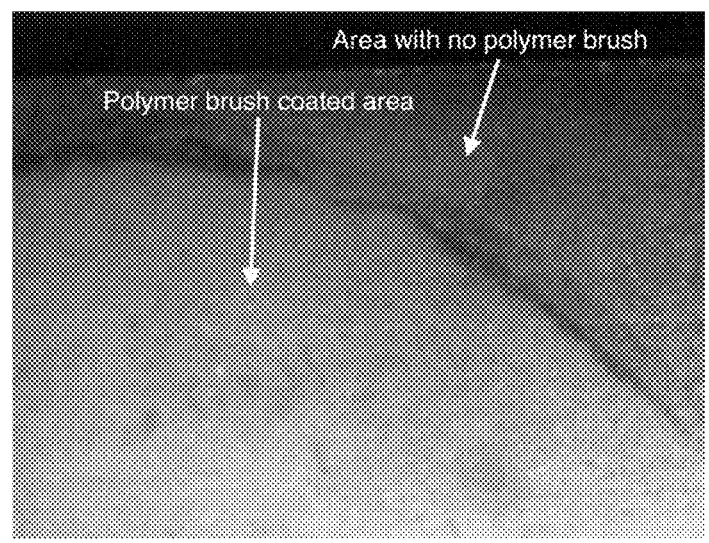
FIG. 7 shows the polymer brush formation in the area where the swelled polymer gel has been in contact with polymerisation initiators, cf. Example 6.

The formation of a homogenous polymer brush coating was seen only in the area where the polymerisation medium with the polymer gel had been in contact with the surface (confirmed by optical microscopy, shown in FIG. 7). The distinction between the two different areas was also confirmed by water contact angle measurement.

In FIG. 7, a clear boundary is seen between the polymer brush coated area, where the polymerisation medium and the polymer gel had been in contact with the surface, and the blank aluminium substrate with only initiators immobilised.

Example 7

Formation of Polymer Brushes Using the Polymer Gel, PAH/TA/Fe(III) in a More Dense Form.

This example is similar to the preceding Example 6, in that poly(glycidyl methacrylate) polymer brushes were formed by swelling PAH/TA/Fe(III) polymer gel in the polymerisation medium for creating poly(glycidyl methacrylate) polymer brushes. In the present example, a more dense swelled gel (polymer gel and polymerisation medium) is obtained by adding less polymerisation medium.

Firstly, the polymerisation medium (yet without oxygen scavenger as polymerisation activator) was prepared by mixing 104 µl DI-water, 104 µl EtOH, 60 µl PMDETA/catalyst stock solution (prepared in Example 2) and 31 µl glycidyl methacrylate. Secondly, PAH/TA/Fe(III) polymer gel was prepared by mixing 0.5 ml 40% PAH in water, 14.8 mg tannic acid and 0.17 ml 0.00865 M FeCl3 in DI-water. Thirdly, the polymerisation medium and the polymer gel were combined, giving a dark blue solution where the polymer gel is swelled in the polymerisation medium. At this stage the polymer gel combined with the polymerisation medium was acidic, and hence was in its liquid form.

To gellate the mixture, pH of the solution was increased to above pH 7 by adding a NaOH solution. Notably, by adding the oxygen scavenger activator NaAsc combined with the NaOH solution, the polymerisation medium was simultaneously activated to enable the polymer brush formation. Hence, 4.3 mg NaAsc was added to 0.33 ml 1 M NaOH, and the solution was added to the mixture of the polymer gel with the polymerisation medium. This yielded a dark red, dense solution of the polymerisation medium contained in the polymer gel.

Figure 8:
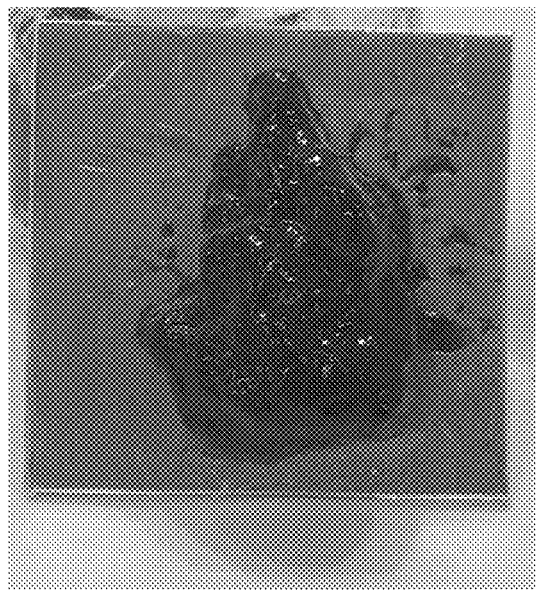
FIG. 8 shows the swelled polymer gel of Example 7.

The swelled gel (combination of polymer gel and polymerisation medium) was placed on a 25×25 mm aluminium plate having polymerisation initiators (3-(trimethoxysilyl)propyl 2-bromo-2-methylpropanoate deposited on aluminium) immobilised thereon. The medium was so dense, that the sample could be placed vertically with the medium staying in place. This is shown in FIG. 8.

After the polymerisation for 1 hour, the plate with the swelled polymer gel/polymerisation medium was submersed in 0.01 M HCl and sonicated for 10 minutes. The acidic pH was the stimuli to "dissolve" the gellate medium, i.e. it became liquid. Afterwards the plate was ultrasonicated for 10 minutes, firstly in water and afterwards in acetone to remove any physiosorbed material.

The formation of a homogenous polymer brush coating was seen only in the area where the swelled, dense polymerisation gel had been in contact with the surface (confirmed by optical microscopy). The distinction between the two different areas was also confirmed by water contact angle measurement.

Furthermore, it was concluded that even with the very dense swelled gel of polymerisation medium and polymer gel, the components of the medium were indeed able to react with the polymerisation initiators immobilised on the surface. Thus, the crucial components for polymer brush formation were freely accessible for polymer brush formation.

Example 8

Formation of Polymer Brushes Using the Polymer Gel, PAH/TA/Fe(III), in an Even Denser Form.

This example is similar to Example 6 and 7, in that poly(glycidyl methacrylate) brushes were formed by swelling the PAH/TA/Fe(III) polymer gel in the polymerisation medium for creating poly(glycidyl methacrylate) polymer brushes. In this example, however, an even denser swelled gel (polymer gel and polymerisation medium) was obtained by adding even less polymerisation medium.

Firstly, the polymerisation medium was prepared by mixing 35 µl DI-water, 35 µl EtOH, 20 µl PMDETA/catalyst stock solution (prepared in Example 2) and 10 µl glycidyl methacrylate (however, yet without polymerisation activator). Secondly, PAH/TA/Fe(III) polymer gel was prepared by mixing 0.5 ml 40% PAH in DI-water, 14.1 mg tannic acid and 0.17 ml 0.00865 M $FeCl_3$ in DI-water. Thirdly, the polymerisation medium and the polymer gel were combined, giving a dark blue solution. At this stage, the polymer gel combined with the polymerisation medium was acidic, and hence was in its liquid form.

To gellate the polymer gel and the polymerisation medium, pH of the solution was increased to above pH 7 by adding a NaOH solution. Notably, by adding the oxygen scavenger polymerisation activator NaAsc combined with the NaOH solution, the medium was simultaneously activated to enable the polymer brush formation. Hence, 4.6 mg NaAsc was added to 0.33 ml 1 M NaOH, and this solution was added to the combination of polymer gel and polymerisation medium. This yielded a dark red, dense solution as the semi-solid form of the swelled polymer gel was formed.

Figure 9:
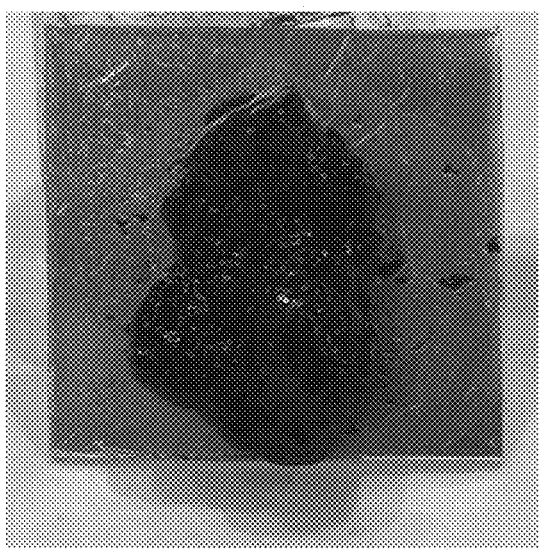
FIG. 9 shows the swelled polymer gel of Example 8.

The swelled polymerisation medium/polymer gel was placed on a 25×25 mm aluminium plate having polymerisation initiators (3-(trimethoxysilyl)propyl 2-bromo-2-methylpropanoate deposited on aluminium) immobilised thereon. The medium was so dense, that the sample could be placed vertically with the medium staying in place. This is shown in FIG. 9.

After the polymerisation for 1 hour, the plate was submersed in 0.01 M HCl and sonicated for 10 minutes. The acidic pH was the stimuli to "dissolve" the swelled polymerisation medium/polymer gel, i.e. it became liquid. Afterwards the plate was ultrasonicated for 10 minutes firstly in water and afterwards in acetone to remove any physiosorbed material.

The formation of a homogenous polymer brush coating was seen only in the area where the gellate polymer gel (polymerisation medium and polymer gel) had been in contact with the surface (confirmed by optical microscopy). The distinction between the two different areas was also confirmed by water contact angle measurement.

Furthermore, it was concluded that even with the more dense swelled gel, the components of the medium were indeed able to react with the polymerisation initiators immobilised on the surface. Thus, the crucial components for polymer brush formation were freely accessible for polymer brush formation.

Example 9

Preparation of Sodium Alginate Polymer Gels

Various polymer gels of sodium alginate were prepared by mixing 4 g, 5 g, 6 g and 8 g sodium alginate, respectively, in 100 ml DI-water forming 4 w % v %, 5 w %/v %, 6 w %/v % and 8 w %/v %, respectively, sodium alginate polymer gels. The resulting polymer gels were in all cases viscous liquids.

Example 10

Formation of Polymer Brushes Using Sodium Alginate Polymer Gel in a 14% Ethanol Solvent System.

Firstly, the polymer gel was prepared by dissolving 150.1 mg sodium ascorbate (NaAsc, activator) with 17 ml sodium alginate solution (4 w %/v %) prepared according to Example 9. The mixture became a light brown dense liquid. The polymer gel with the activator was kept in a container.

In another container, 1.6 ml methyl methacrylate (MMA) was mixed with 7.1 ml Cu-catalyst/Me6TREN solution ([Cu]=93.8 mg/l) and 4.3 ml ethanol, thus, forming the polymerisation medium.

The polymerisation medium was poured into the sodium alginate polymer gel under stirring. Upon mixing, the solution became light blue and after approximately 5 minutes, the mixture became white. The polymer gel was, thus, swelled in the polymerisation medium.

The obtained polymer gel swelled in the polymerisation medium was transferred to a 10×10 mm stainless steel plate (304 steel alloy) having polymerisation initiators (4-(chloromethyl)phenyltrimethoxysilane deposited on stainless steel) immobilised thereon. The polymer gel swelled in the polymerisation medium was very dense and covered the plate evenly and nicely. The plate was left for 10 minutes, allowing polymer brushed to form on the plate. The plate was subsequently placed in a beaker with DI-water. The change in solvent polarity was the stimuli to "dissolve" the swelled polymer gel/polymerisation medium and remove it from the plate. It was additionally rinsed by sonification in water for 5 minutes followed by further rinsing by 5 minutes sonication in acetone.

The formed polymer brushes were determined to have a thickness of 57±7 nm by ellipsometry. The polymeric structure of the formed polymer brushes was further confirmed by infrared reflection absorption spectroscopy (IRRAS).

Figure 10:
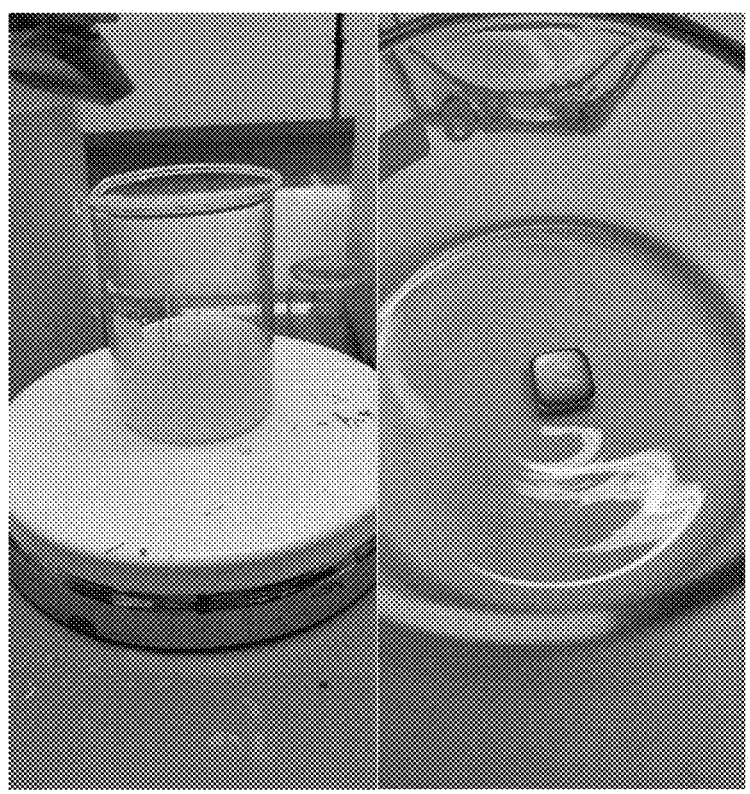
FIG. 10 shows the polymer gel swelled in the polymerisation medium (left) and the swelled polymer gel transferred to a plate (right), cf. Example 10.
Figure 11:
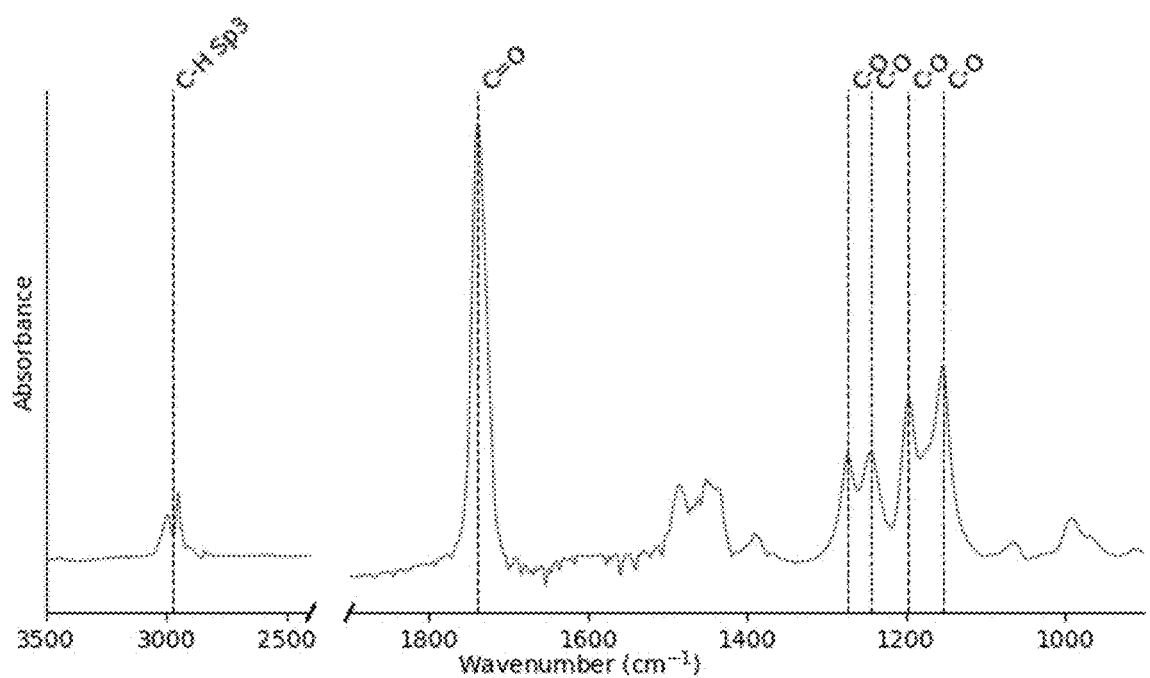
FIG. 11 shows, the IRRAS spectrum after formation of the PMMA polymer brushes, cf. Example 10.

In FIG. 10, the polymer gel swelled in the polymerisation medium (left) and the swelled polymer gel transferred to the plate (right) are shown. In FIG. 11, the IRRAS spectrum after formation of the polymer brushes is shown. Importantly, the peaks at 2974, 1739, 1273, 1244, 1195 and 1153 $cm^{-1}$ confirm the presence of sp3 hybridized carbon hydrogen bonds, carbonyls and carbon oxygen bonds, respectively, coherent with what is expected for a PMMA polymer brush.

Example 11

Formation of Polymer Brushes Using Sodium Alginate Polymer Gel in 63% Ethanol Solvent System.

The procedure was performed as described in Example 10 using 150 mg sodium ascorbate (activator) and 17 ml sodium alginate solution (4 w %/v %) prepared according to Example 9. The mixture became a light brown dense liquid. The polymer gel with the activator was kept in a container.

1.6 ml methyl methacrylate (MMA) was mixed with 2 ml Cu-catalyst/Me6TREN solution ([Cu]=333 mg/l) and 9.4 ml ethanol, forming the polymerisation medium.

The polymerisation medium was poured into the sodium alginate polymer gel under stirring. Upon mixing, the solution became light blue and after approximately 5 minutes, the mixture became light yellow. The polymer gel was, thus, swelled in the polymerisation medium.

The obtained polymer gel swelled in the polymerisation medium was transferred to a plate 10×10 mm stainless steel plate (304 steel alloy) having polymerisation initiators (4-(Chloromethyl)phenyltrimethoxysilane deposited on stainless steel) immobilised thereon. The polymer gel swelled in the polymerisation medium was very dense and covered the plate evenly and nicely. The plate was left for 10 minutes, allowing polymer brushed to form on the plate. The plate was subsequently placed in a beaker with DI-water. The change in solvent polarity was the stimuli to "dissolve" the swelled polymer gel and remove it from the plate. It was additionally rinsed by sonification in water for 5 minutes followed by further rinsing by 5 minutes sonication in acetone. The formed polymer brushes were determined to have a thickness of 78±7 nm by ellipsometry. The polymeric structure of the formed polymer brushes was further confirmed by infrared reflection absorption spectroscopy (IR-RAS).

Figure 12:
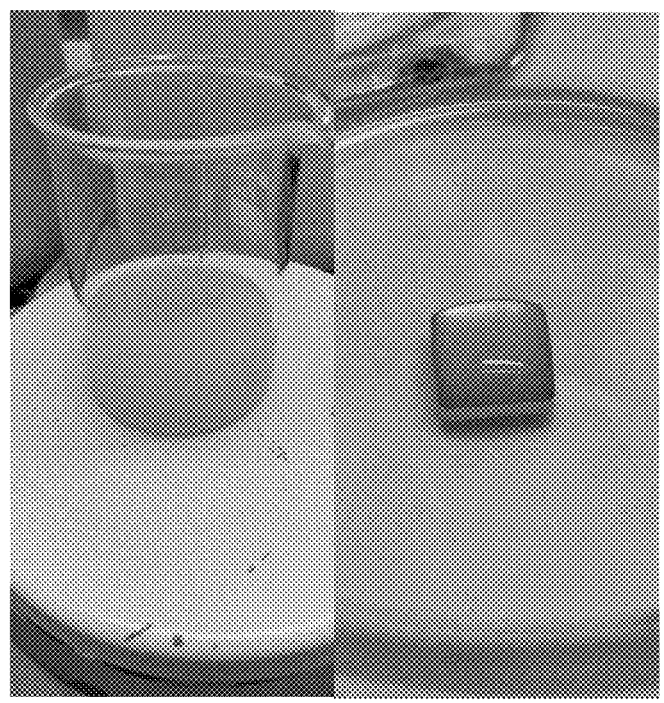
FIG. 12 shows the polymer gel swelled in the polymerisation medium (left) and the swelled polymer gel transferred to a plate (right), cf. Example 11.
Figure 13:
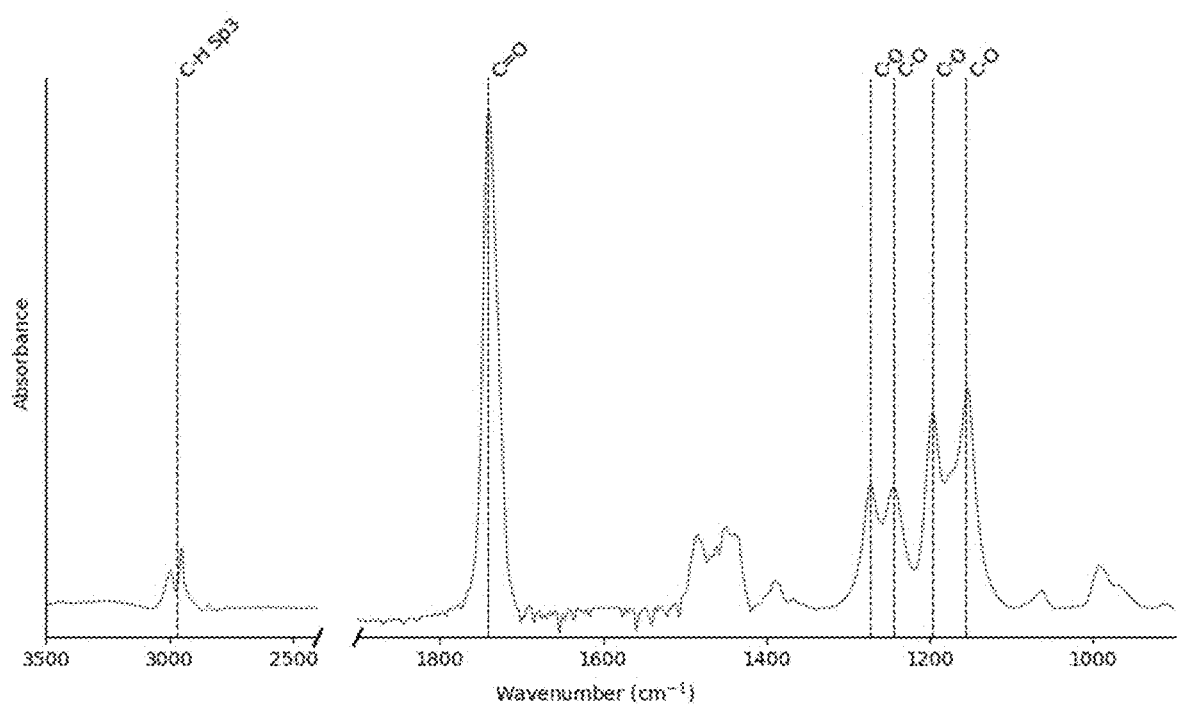
FIG. 13 shows the IRRAS spectrum after formation of the PMMA polymer brushes, cf. Example 11.

In FIG. 12, the polymer gel swelled in the polymerisation medium (left) and the swelled polymer gel transferred to the plate (right) are shown. In FIG. 13, the IRRAS spectrum after formation of the polymer brushes is shown. Importantly, the peaks at 2974, 1741, 1271, 1243, 1197 and 1154 cm$^{-1}$ confirm the presence of sp3 hybridized carbon hydrogen bonds, carbonyls and carbon oxygen bonds, respectively, coherent with what is expected for a PMMA polymer brush.

Example 12

Formation of Polymer Brushes Using Sodium Alginate Polymer Gel and an Aprotic Solvent in the Polymerisation Medium.

The procedure was performed as in Example 10 using 150.3 mg sodium ascorbate (activator) dissolved in 17 ml sodium alginate polymer gel (5 w %/v %). The mixture was stirred yielding a light brown dense liquid.

The polymerisation medium was a mixture of 1.6 ml methyl methacrylate (MMA) mixed with 1.5 ml Cu-catalyst/Me6TREN solution ([Cu]=427 mg/l), 0.5 ml DI-water and 9.4 ml DMSO solvent.

The polymerisation medium was poured into the polymer gel/activator liquid and stirred. Upon mixing, the combined solution became light blue and after approximately 5 minutes, the combined solution was dense and clear.

The polymerisation gel swelled in the polymerisation medium was transferred to a 10×10 mm stainless steel plate (304 steel alloy) having polymerisation initiators (4-(chloromethyl)phenyltrimethoxysilane deposited on stainless steel) immobilised thereon and left for 10 minutes for transformation of the polymer brushes. The plate was rinsed as described in Example 10.

The formed polymer brushes were determined to have a thickness of 64±32 nm by ellipsometry. The polymeric structure of the formed polymer brushes was further confirmed by infrared reflection absorption spectroscopy (IR-RAS).

Figure 14:
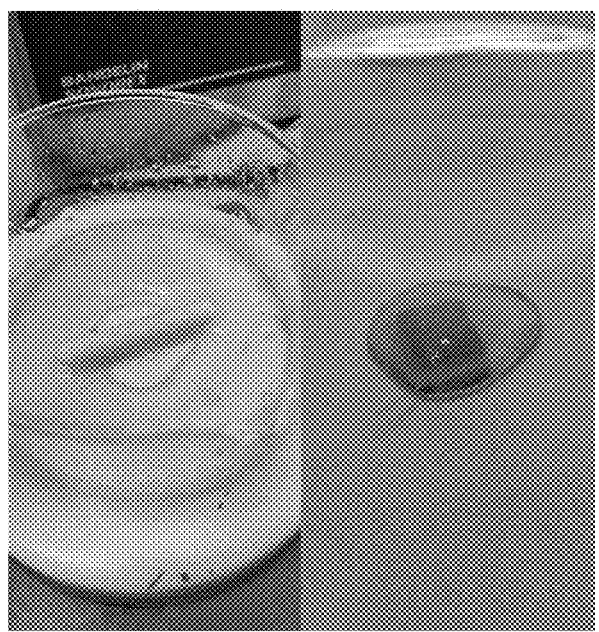
FIG. 14 shows the polymer gel swelled in the polymerisation medium (left) and the swelled polymer gel transferred to a plate (right), cf. Example 12.
Figure 15:
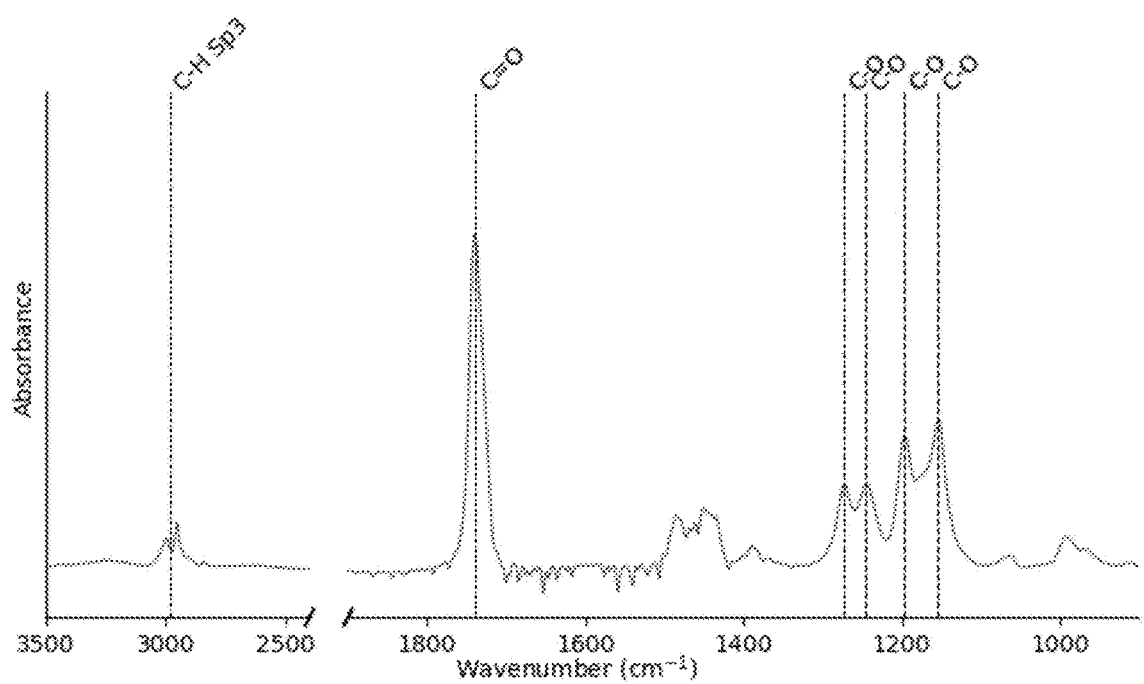
FIG. 15 shows the IRRAS spectrum after formation of the PMMA polymer brushes, cf. Example 12.

In FIG. 14, the polymer gel swelled in the polymerisation medium (left) and the swelled polymer gel transferred to the plate (right) are shown. In FIG. 15, the IRRAS spectrum after formation of the polymer brushes is shown. Importantly, the peaks at 2967, 1741, 1273, 1243, 1197 and 1154 cm$^{-1}$ confirm the presence of sp3 hybridized carbon hydrogen bonds, carbonyls and carbon oxygen bonds, respectively, coherent with what is expected for a PMMA polymer brush.

Example 13

Formation of Polymer Brushes Using 5 w %/v % Sodium Alginate Polymer Gel in Ethanol Solvent.

The procedure was performed as in Example 10 using 150 mg sodium ascorbate (activator) dissolved in 17 ml sodium alginate polymer gel (5 w %/v %). The mixture was stirred yielding a light brown dense liquid.

The polymerisation medium was a mixture of 1.6 ml methyl methacrylate (MMA) mixed with 1.5 ml Cu-catalyst/Me6TREN solution ([Cu]=427 mg/l), 0.5 ml DI-water and 9.4 ml ethanol solvent.

The polymerisation medium was poured into the polymer gel/activator liquid and stirred. Upon mixing, the combined solution became light blue and after approximately 5 minutes, the combined solution a bright white dense gel. The polymerisation gel swelled in the polymerisation medium was transferred to a 10×10 mm stainless steel plate (304 steel alloy) having polymerisation initiators (4-(chloromethyl)phenyltrimethoxysilane deposited on stainless steel) immobilised thereon and left for 10 minutes for transformation of the polymer brushes. The plate was rinsed as described in Example 10.

The formed polymer brushes were determined to have a thickness of 64±6 nm by ellipsometry. The polymeric structure of the formed polymer brushes was further confirmed by infrared reflection absorption spectroscopy (IRRAS).

Figure 16:
FIG. 16 shows the polymer gel swelled in the polymerisation medium (left) and the swelled polymer gel transferred to a plate (right), cf. Example 13.
Figure 17:
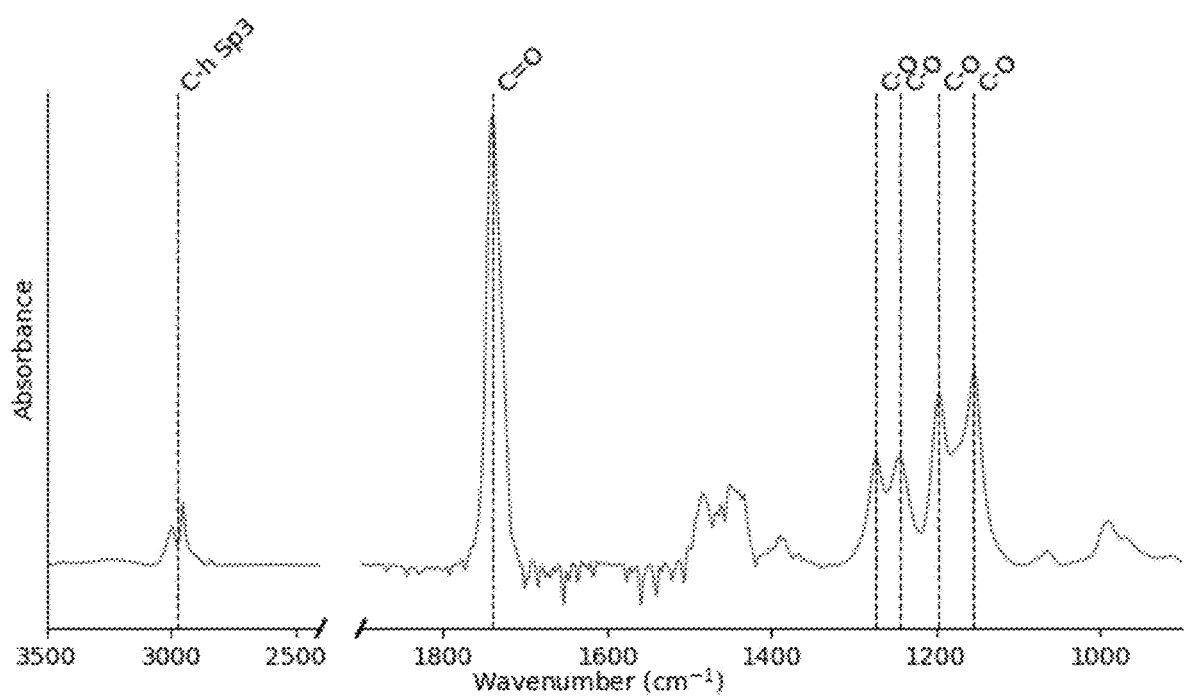
FIG. 17 shows the IRRAS spectrum after formation of the PMMA polymer brushes, cf. Example 13.

In FIG. 16, the polymer gel swelled in the polymerisation medium (left) and the swelled polymer gel transferred to the plate (right) are shown. In FIG. 17, the IRRAS spectrum after formation of the polymer brushes is shown. Importantly, the peaks at 2974, 1739, 1273, 1243, 1197 and 1154 cm$^{-1}$ confirm the presence of sp3 hybridized carbon hydrogen bonds, carbonyls and carbon oxygen bonds, respectively, coherent with what is expected for a PMMA polymer brush.

Example 14

Formation of Polymer Brushes Using 6 w %/v % Sodium Alginate Polymer Gel in Ethanol Solvent.

The procedure was performed as in Example 10 using 150 mg sodium ascorbate (activator) dissolved in 17 ml sodium alginate polymer gel (6 w %/v %). The mixture was stirred yielding a light brown dense liquid.

The polymerisation medium was a mixture of 1.6 ml methyl methacrylate (MMA) mixed with 1.5 ml Cu-catalyst/Me6TREN solution ([Cu]=427 mg/l), 0.5 ml DI-water and 9.4 ml ethanol solvent.

The polymerisation medium was poured into the polymer gel/activator liquid and stirred. Upon mixing, the combined solution became light blue and after approximately 5 minutes, the combined solution a bright white dense gel. The polymerisation gel swelled in the polymerisation medium was transferred to a 10×10 mm stainless steel plate (304 steel alloy) having polymerisation initiators (4-(Chloromethyl)phenyltrimethoxysilane deposited on stainless steel)

immobilised thereon and left for 10 minutes for formation of polymer brushes. The plate was rinsed as described in Example 10.

The formed polymer brushes were determined to have a thickness of 56±10 nm by ellipsometry. The polymeric structure of the formed polymer brushes was further confirmed by infrared reflection absorption spectroscopy (IR-RAS).

Figure 18:
FIG. 18 shows the polymer gel swelled in the polymerisation medium (left) and the swelled polymer gel transferred to a plate (right), cf. Example 14.
Figure 19:
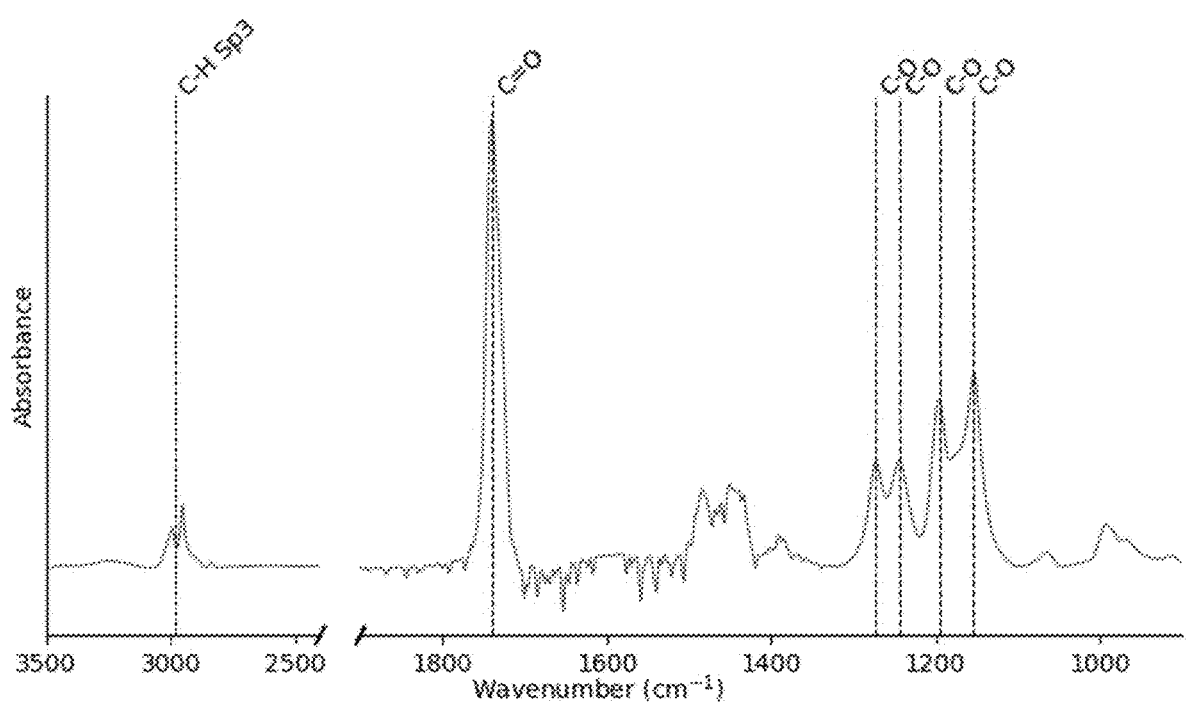
FIG. 19 shows the IRRAS spectrum after formation of the PMMA polymer brushes, cf. Example 14.

In FIG. 18, the polymer gel swelled in the polymerisation medium (left) and the swelled polymer gel transferred to the plate (right) are shown. In FIG. 19, the IRRAS spectrum after formation of the polymer brushes is shown. Importantly, the peaks at 2974, 1739, 1273, 1243, 1197 and 1154 cm$^{-1}$ confirm the presence of sp3 hybridized carbon hydrogen bonds, carbonyls and carbon oxygen bonds, respectively, coherent with what is expected for a PMMA brush.

Example 15

Formation of Polymer Brushes Using 8 w %/v % Sodium Alginate Polymer Gel in Ethanol Solvent.

The procedure was performed as in Example 10 using 150 mg sodium ascorbate (activator) dissolved in 17 ml sodium alginate polymer gel (8 w %/v %). The mixture was stirred yielding a light brown dense liquid.

The polymerisation medium was a mixture of 1.6 ml methyl methacrylate (MMA) mixed with 1.5 ml Cu-catalyst/Me6TREN solution ([Cu]=427 mg/l), 0.5 ml DI-water and 9.4 ml ethanol solvent.

The polymerisation medium was poured into the polymer gel/activator liquid and stirred. Upon mixing, the combined solution became light blue and after approximately 5 minutes, the combined solution a white dense gel.

The polymerisation gel swelled in the polymerisation medium was transferred to a 10×10 mm stainless steel plate (304 steel alloy) having polymerisation initiators (4-(chloromethyl)phenyltrimethoxysilane deposited on stainless steel) immobilised thereon and left for 10 minutes for formation of polymer brushes. The plate was rinsed as described in Example 10.

The formed polymer brushes were determined to have a thickness of 37±10 nm by ellipsometry. The polymeric structure of the formed polymer brushes was further confirmed by infrared reflection absorption spectroscopy (IR-RAS).

Figure 20:
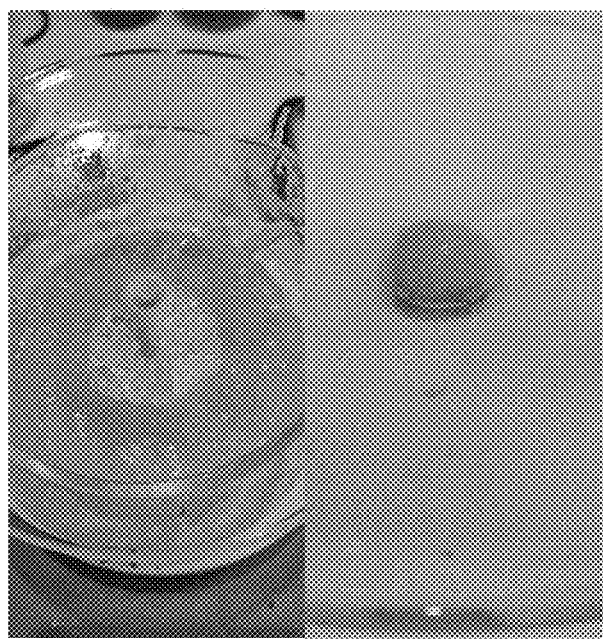
FIG. 20 shows the polymer gel swelled in the polymerisation medium (left) and the swelled polymer gel transferred to a plate (right), cf. Example 15.

In FIG. 20, the polymer gel swelled in the polymerisation medium (left) and the swelled polymer gel transferred to the plate (right) are shown.

Example 16

Formation of Poly(Styrene) Polymer Brushes Using Sodium Alginate Polymer Gel.

The procedure was performed as in Example 10 using 150.2 mg sodium ascorbate (activator) dissolved in 17 ml sodium alginate polymer gel (5 w %/v %). The mixture was stirred yielding a light brown dense liquid.

The polymerisation medium was a mixture of 1.6 ml styrene (monomer) mixed with 1.5 ml Cu-catalyst/Me6TREN solution ([Cu]=427 mg/l), 0.5 ml DI-water and 9.4 ml ethanol solvent. The polymerisation medium was poured into the polymer gel/activator liquid and stirred. Upon mixing, the combined solution became light blue and after approximately 5 minutes, the combined solution was a white dense gel.

The polymerisation gel swelled in the polymerisation medium was transferred to a 10×10 mm stainless steel plate (304 steel alloy) having polymerisation initiators (4-(chloromethyl)phenyltrimethoxysilane deposited on stainless steel) immobilised thereon and left for 10 minutes for formation of polymer brushes. The plate was rinsed as described in Example 10.

The formed polymer brushes were determined to have a thickness of 10±2 nm by ellipsometry. Water contact angle measurement after polymerisation yielded a water contact angle of 84° which confirmed that the surface of the plate with polymer brushes was hydrophobic in coherence with PS.

Figure 21:
FIG. 21 shows the polymer gel swelled in the polymerisation medium (left) and the swelled polymer gel transferred to a plate (right), cf. Example 16.
Figure 22:
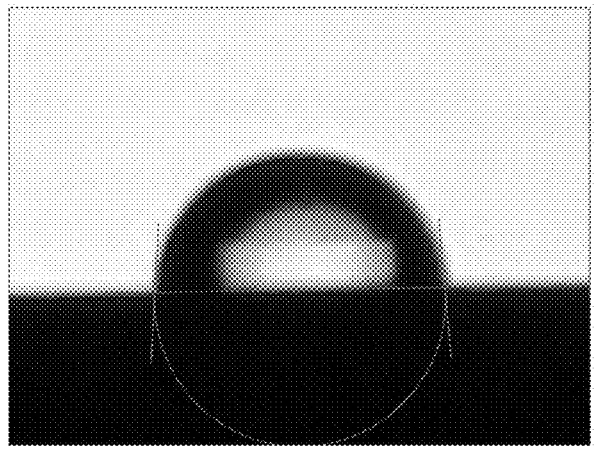
FIG. 22 shows the water contact angle between the plate with formed polymer brushes and a droplet of water, cf. Example 16.

In FIG. 21, the polymer gel swelled in the polymerisation medium (left) and the swelled polymer gel transferred to the plate (right) are shown. In FIG. 22, the water contact angle of the plate and a droplet of water is shown.

Example 17

Formation of PHEMA Polymer Brushes Using Sodium Alginate Polymer Gel.

The procedure was performed as in Example 10 using 150.2 mg sodium ascorbate (activator) dissolved in 17 ml sodium alginate polymer gel (5 w %/v %). The mixture was stirred yielding a light brown dense liquid.

The polymerisation medium was a mixture of 1.6 ml 2-(hydroxyethyl)-methacrylate (HEMA) (monomer) mixed with 1.5 ml Cu-catalyst/Me6TREN solution ([Cu]=427 mg/l), 0.5 ml DI-water and 9.4 ml ethanol solvent. The polymerisation medium was poured into the polymer gel/activator liquid and stirred. Upon mixing, the combined solution became light blue and after approximately 5 minutes, the combined solution was a white dense gel.

The polymerisation gel swelled in the polymerisation medium was transferred to a 10×10 mm stainless steel plate (304 steel alloy) having polymerisation initiators (4-(chloromethyl)phenyltrimethoxysilane deposited on stainless steel) immobilised thereon and left for 10 minutes for formation of polymer brushes. The plate was rinsed as described in Example 10.

The formed polymer brushes were determined to have a thickness of 5±7 nm by ellipsometry. Water contact angle measurement after polymerization yielded a water contact angle of 29° which confirmed that the surface of the plate with polymer brushes was hydrophobic in coherence with PHEMA.

Figure 23:
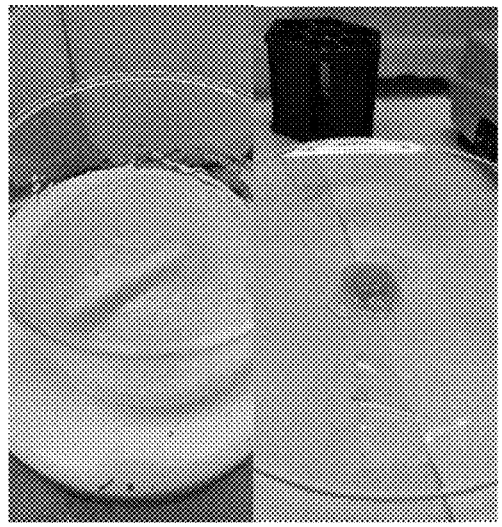
FIG. 23 shows the polymer gel swelled in the polymerisation medium (left) and the swelled polymer gel transferred to a plate (right), cf. Example 17.
Figure 24:
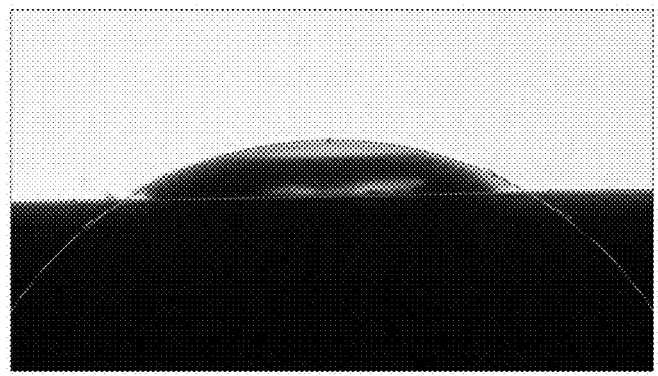
FIG. 24 shows the water contact angle between the plate with formed polymer brushes and a droplet of water, cf. Example 17.

In FIG. 23, the polymer gel swelled in the polymerisation medium (left) and the swelled polymer gel transferred to the plate (right) are shown. In FIG. 24, the water contact angle of the plate and a droplet of water is shown.

Example 18

Formation of PGMA Polymer Brushes Using Sodium Alginate Polymer Gel.

18 mg sodium ascorbate (activator) was dissolved in 2 ml sodium alginate polymer gel (4 w %/v %). The mixture was stirred.

The polymerisation medium was a mixture of 104 µl glycidyl methacrylate (GMA) (momoner) mixed with 135 µl Cu-catalyst/Me6TREN solution ([Cu]=427 mg/l), and 624 µl ethanol solvent. 1136 µl of the combined polymer gel/sodium ascorbate solution was transferred to the polymerisation solution and stirred. Upon mixing, the combined solution became light blue and after approximately 5 minutes, the combined solution was white dense gel.

The polymerisation gel swelled in the polymerisation medium was transferred to a plate 25×25 mm stainless steel plate (304 steel alloy) having polymerisation initiators (4-(Chloromethyl)phenyltrimethoxysilane deposited on stainless steel) immobilised thereon and left for 30 minutes for formation of polymer brushes. The plate was rinsed as described in Example 10.

The formed polymer brushes were determined to have a thickness of 99±17 nm by ellipsometry. The polymeric structure of the formed polymer brushes was further confirmed by infrared reflection absorption spectroscopy (IR-RAS).

Figure 25:
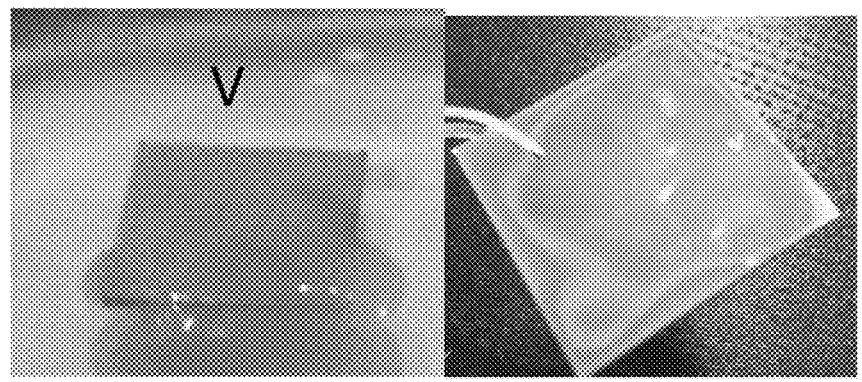
FIG. 25 shows the polymer gel swelled in the polymerisation medium (left) and visually a homogeneous polymer brush film only where the polymer gel swelled in the polymerisation medium was placed on the surface (right), cf. Example 18.
Figure 26:
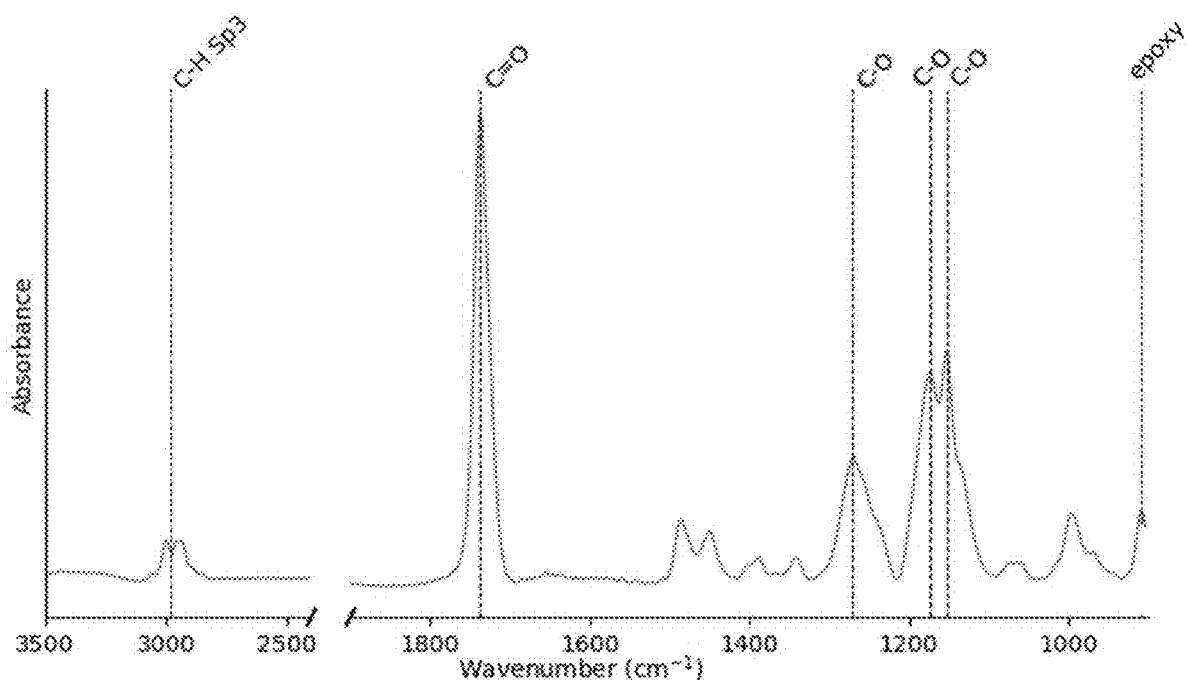
FIG. 26 shows the IRRAS spectrum after formation of the PGMA polymer brushes, cf. Example 18.

In FIG. 25, the polymer gel swelled in the polymerisation medium (left) and the swelled polymer gel transferred to the plate (right) are shown. In FIG. 26, the IRRAS spectrum after formation of the polymer brushes is shown. Importantly, the peaks at 2974, 1737, 1269, 1243, 1173 and 1152 $cm^{-1}$ confirm the presence of sp3 hybridized carbon hydrogen bonds, carbonyls and carbon oxygen bonds, respectively. Lastly at 908 $cm^{-1}$ the epoxy group of the glycidyl is observed. All these peaks are coherent with what is expected for a PGMA polymer brush.

Example 19

Preparation of Xanthan Gum Polymer Gels.

Various polymer gels of sodium alginate were prepared by mixing 2 g, 3 g, 4 g, 4.5 g and 6 g, respectively, xanthan gum in 100 ml DI-water forming 2 w %v %, 3 w %/v %, 4 w %/v %, 4.5 w %/v % and 6 w %/v %, respectively, xanthan gum polymer gels. The resulting polymer gels were in all cases viscous liquids.

Example 20

Formation of PMMA Polymer Brushes Using Xanthan Gum in 2 w %/v %.

150 mg sodium ascorbate was dissolved in 17 ml xanthan gum polymer gel (2 w %/v %) and stirred yielding a light brown dense liquid.

In another container, 1.6 ml methyl methacrylate (MMA monomer) was mixed with 1.5 ml Cu-catalyst/Me6TREN-stock solution ([Cu]=427 mg/l), 0.5 mL of water and 9.4 ml ethanol (polymerisation medium) and poured into the xanthan gum solution under stirring. Upon mixing, the solution (polymer gel swelled in polymerisation medium) became a clear gel.

The formed polymer gel was transferred to the sample plate 10×10 mm stainless steel plate (304 steel alloy) having polymerisation initiators (4-(chloro-methyl)phenyltrimethoxysilane deposited on stainless steel) immobilised thereon and the polymerization was carried out for 10 minutes. The plate was subsequently placed in a beaker with DI-water. The change in solvent polarity was the stimuli to "dissolve" the swelled polymer gel and remove it from the plate. It was additionally rinsed by sonification in water for 5 minutes followed by further rinsing by 5 minutes sonication in acetone.

The formed polymer brushes were determined to have a thickness of 64±6 nm by ellipsometry.

Example 21

Formation of PMMA Polymer Brushes Using Xanthan Gum (3 w %/v %).

150 mg sodium ascorbate was dissolved in 17 ml xanthan gum solution (3 w %/v %) and stirred yielding a light brown dense liquid.

In another container 1.6 ml methyl methacrylate (MMA monomer) was mixed with 1.5 ml Cu catalyst/Me6TREN-stock solution ([Cu]=427 mg/l), 0.5 ml of water and 9.4 ml ethanol (polymerisation medium) and poured into the xanthan gum polymer gel under stirring. Upon mixing the solution (polymer gel swelled in polymerisation medium) became a clear gel.

The formed gel was transferred to the sample plate 10×10 mm stainless steel plate (304 steel alloy) having polymerisation initiators (4-(chloromethyl)phenyl-trimethoxysilane deposited on stainless steel) immobilised thereon and the polymerisation was carried out for 10 minutes. The plate was subsequently placed in a beaker with DI-water. The change in solvent polarity was the stimuli to "dissolve" the swelled polymer gel and remove it from the plate. It was additionally rinsed by sonification in water for 5 minutes followed by further rinsing by 5 minutes sonication in acetone.

Figure 27:
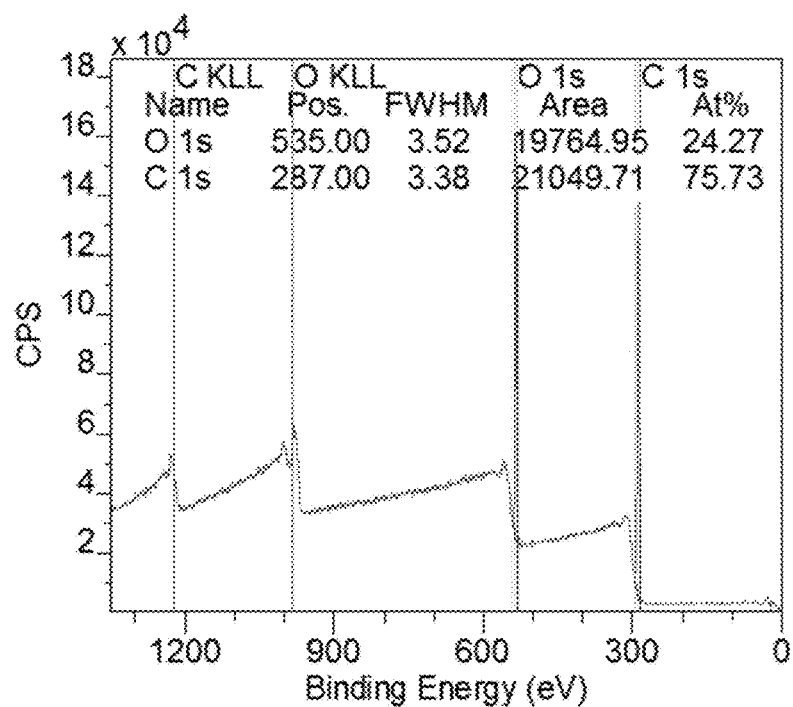
FIG. 27 shows the XPS survey spectrum of the PMMA polymer brush, cf. example 21.
Figure 28:
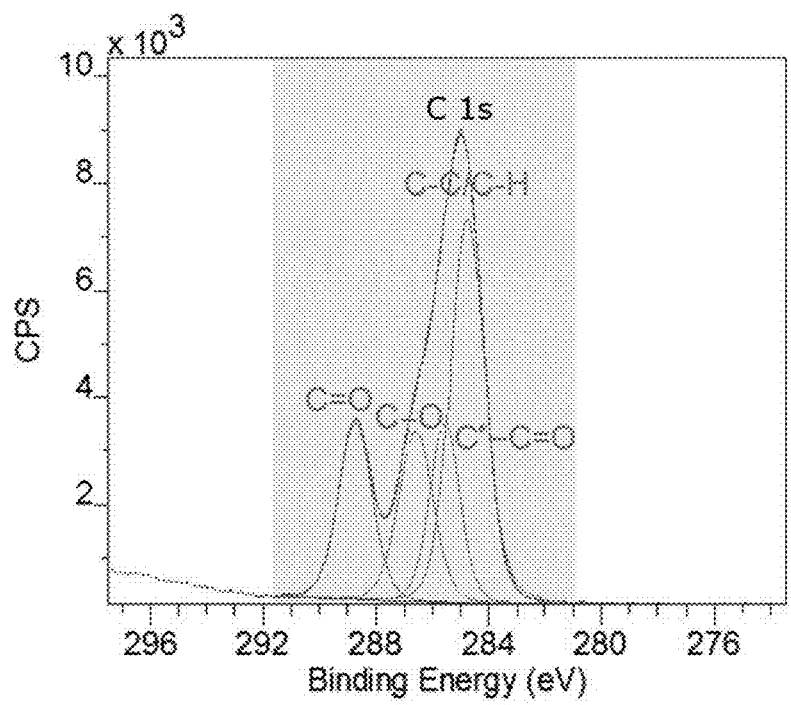
FIG. 28 shows the high-resolution spectrum of the carbon peak of the PMMA polymer brush, cf. example 21.

The formed polymer brushes were determined to have a thickness of 54±10 nm by ellipsometry. The chemical composition of the PMMA polymer brush was confirmed by XPS (FIG. 27). Importantly, the peaks at 535 and 287 eV confirm the presence of oxygen and carbon, respectively. The atom percentage of 24.3% for oxygen and 75.7% for carbon is in coherence with the theoretical values for a PMMA polymer. In FIG. 28, a high-resolution spectrum of the carbon peak is shown, verifying the chemical structure of the PMMA polymer brush.

Example 22

Formation of PMMA Polymer Brushes Using Xanthan Gum Polymer Gel (4 w %/v %).

150 mg sodium ascorbate was dissolved in 17 ml xanthan gum polymer gel (4 w %/v %) and stirred yielding a light brown dense liquid.

In another container, 1.6 ml methyl methacrylate (MMA monomer) was mixed with 1.5 ml Cu catalyst/Me6TREN-stock solution ([Cu]=427 mg/l), 0.5 ml of water and 9.4 ml ethanol (polymerisation medium) and poured into the xanthan solution under stirring. Upon mixing the solution (polymer gel swelled in the polymerisation medium) became a clear gel.

The formed gel was transferred to the sample plate 10×10 mm stainless steel plate (304 steel alloy) having polymerisation initiators (4-(chloromethyl)phenyl-trimethoxysilane deposited on stainless steel) immobilised thereon and the polymerisation was carried out for 10 minutes. The plate was subsequently placed in a beaker with DI-water. The change in solvent polarity was the stimuli to "dissolve" the swelled polymer gel and remove it from the plate. It was additionally rinsed by sonification in water for 5 minutes followed by further rinsing by 5 minutes sonication in acetone.

The formed polymer brushes were determined to have a thickness of 63±21 nm by ellipsometry.

Example 23

Formation of PMMA Polymer Brushes Using Xanthan Gum Polymer Gel (4.5 w %/v %).

150 mg sodium ascorbate was dissolved in 17 ml xanthan gum polymer gel (4.5 w %/v %) and stirred yielding a light brown dense liquid.

In another container, 1.6 ml methyl methacrylate (MMA monomer) was mixed with 1.5 ml Cu catalyst/Me6TREN-stock solution ([Cu]=427 mg/l), 0.5 ml of water and 9.4 ml ethanol(polymerisation medium) and poured into the xanthan gum polymer gel under stirring. Upon mixing the solution became a clear gel.

The formed gel was transferred to the sample plate 10×10 mm stainless steel plate (304 steel alloy) having polymerisation initiators (4-(chloromethyl)phenyl-trimethoxysilane deposited on stainless steel) immobilised thereon and the polymerisation was carried out for 10 minutes. The plate was subsequently placed in a beaker with DI-water. The change in solvent polarity was the stimuli to "dissolve" the swelled polymer gel and remove it from the plate. It was additionally rinsed by sonification in water for 5 minutes followed by further rinsing by 5 minutes sonication in acetone.

The formed PMMA polymer brushes were determined to have a thickness of 7±2 nm by ellipsometry.

Example 24

Formation of PMMA Polymer Brushes Using Xanthan Gum Polymer Gel (6 w %/v %).

150 mg sodium ascorbate was dissolved in 17 ml xanthan gum polymer gel (6 w %/v %) and stirred yielding a light brown dense liquid.

In another container, 1.6 ml methyl methacrylate (MMA monomer) was mixed with 1.5 ml Cu catalyst/Me6TREN-stock solution ([Cu]=427 mg/l), 0.5 ml of water and 9.4 ml ethanol (polymerisation medium) and poured into the xanthan gum polymer gel under stirring. Upon mixing the solution (polymer gel swelled in the polymerisation medium) became a clear gel.

The formed gel was transferred to the sample plate 10×10 mm stainless steel plate (304 steel alloy) having polymerisation initiators (4-(chloromethyl)-phenyltrimethoxysilane deposited on stainless steel) immobilised thereon and the polymerisation was carried out for 10 minutes. The plate was subsequently placed in a beaker with DI-water. The change in solvent polarity was the stimuli to "dissolve" the swelled polymer gel and remove it from the plate. It was additionally rinsed by sonification in water for 5 minutes followed by further rinsing by 5 minutes sonication in acetone.

The formed PMMA polymer brushes were determined to have a thickness of 50±34 nm by ellipsometry.

Example 25

Formation of Poly(Styrene) Polymer Brushes Using Xanthan Gum Polymer Gel (4 w %/v %).

150 mg sodium ascorbate was dissolved in 17 ml xanthan gum polymer gel (4 w %/v %) and stirred yielding a light brown dense liquid.

In another container, 1.6 ml styrene (monomer) was mixed with 1.5 ml Cu catalyst/Me6TREN-stock solution ([Cu]=427 mg/l), 0.5 ml of water and 9.4 ml ethanol (polymerisation medium) and poured into the xanthan gum polymer gel under stirring. Upon mixing the solution became a clear gel.

The formed gel was transferred to the sample plate 10×10 mm stainless steel plate (304 steel alloy) having polymerisation initiators (4-(chloromethyl)phenyl-trimethoxysilane deposited on stainless steel) immobilised thereon and the polymerisation was carried out for 10 minutes. The plate was subsequently placed in a beaker with DI-water. The change in solvent polarity was the stimuli to "dissolve" the swelled polymer gel and remove it from the plate. It was additionally rinsed by sonification in water for 5 minutes followed by further rinsing by 5 minutes sonication in acetone.

Figure 29:
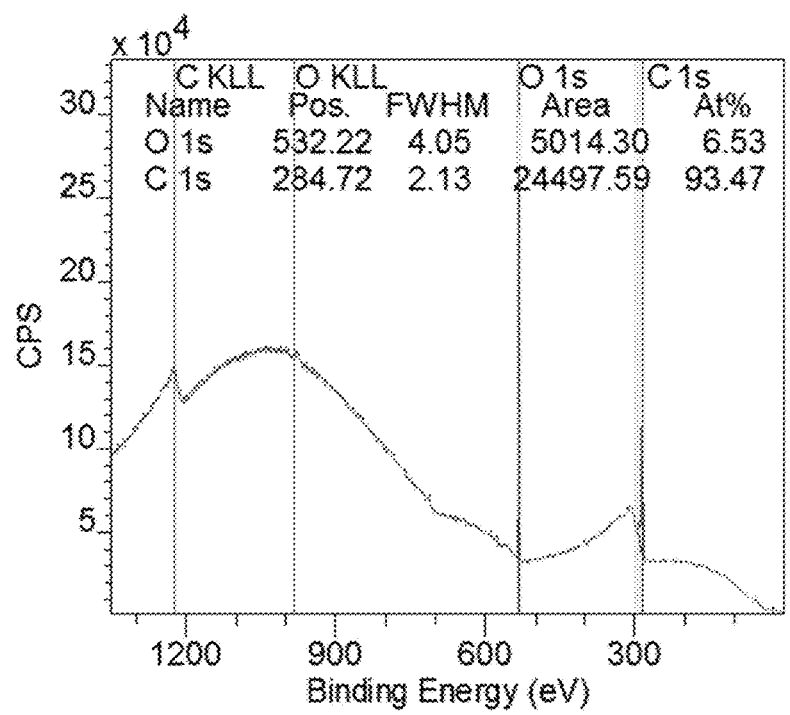
FIG. 29 shows the XPS survey spectrum of the PS polymer brush, cf. example 25.
Figure 30:
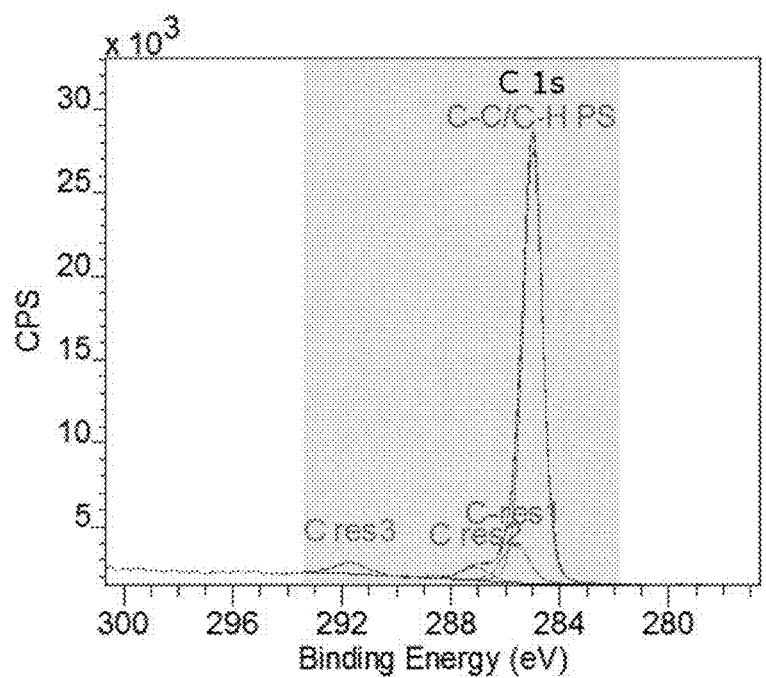
FIG. 30 shows the high-resolution spectrum of the carbon peak of the PS polymer brush, cf. example 25.
Figure 31:
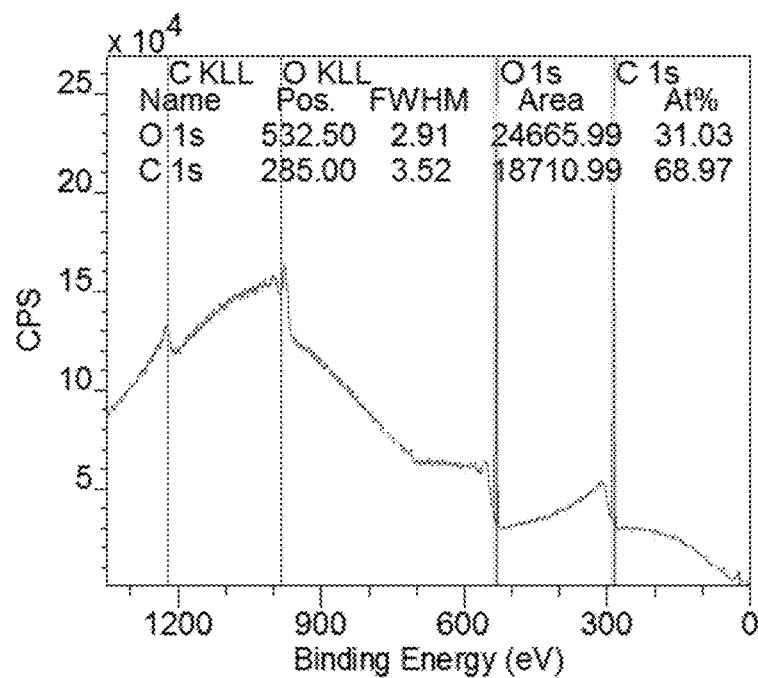
FIG. 31 shows the XPS survey spectrum of the PHEMA polymer brush, cf. example 26.

In FIG. 29, the XPS survey analysis is shown. No peaks from the sample substrate is observed concluding that a polymer brush thickness above 10 nm is achieved (10 nm is the detection limit of the XPS). The chemical composition of the poly(styrene) polymer brush was confirmed by XPS (FIG. 31). Importantly, the peaks at 535 and 287 eV confirm the presence of oxygen and carbon, respectively. The atom percentage of 93.5% for carbon is in coherence with PS (pure carbon-based polymer) and only a minor contamination of oxygen (6.5%). In FIG. 30, a high-resolution spectrum of the carbon peak is shown, verifying the chemical structure of the poly(styrene) polymer brush.

Example 26

Formation of 2-Hydroxyethyl Methacrylate Polymer Brushes Using Xanthan Gum Polymer Gel (4 w %/v %).

150 mg sodium ascorbate was dissolved in 17 ml xanthan gum polymer gel (4 w %/v %) and stirred yielding a light brown dense liquid.

In another container, 1.6 ml 2-hydroxyethyl methacrylate (HEMA monomer) was mixed with 1.5 ml Cu catalyst/Me6TREN-stock solution ([Cu]=427 mg/l), 0.5 ml of water and 9.4 ml ethanol (polymerisation medium) and poured into the xanthan gum polymer gel under stirring. Upon mixing, the solution (polymer gel swelled in the polymerisation medium) became a clear gel.

The formed gel was transferred to the sample plate 10×10 mm stainless steel plate (304 steel alloy) having polymerisation initiators (4-(chloromethyl)phenyl-trimethoxysilane deposited on stainless steel) immobilised thereon and the polymerisation was carried out for 10 minutes. The plate was subsequently placed in a beaker with DI-water. The change in solvent polarity was the stimuli to "dissolve" the swelled polymer gel and remove it from the plate. It was additionally rinsed by sonification in water for 5 minutes followed by further rinsing by 5 minutes sonication in acetone.

Figure 32:
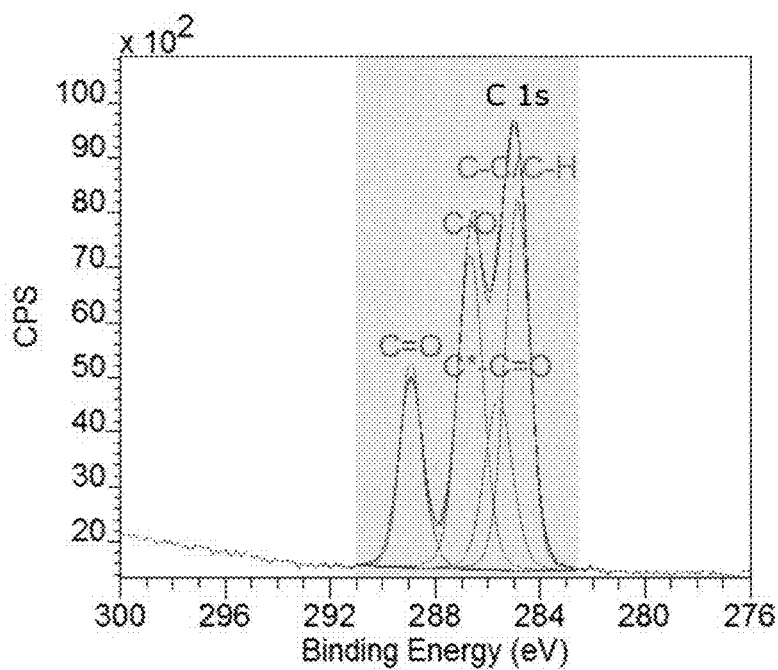
FIG. 32 shows the high-resolution spectrum of the carbon peak of the PHEMA polymer brush, cf. example 26.

In FIG. 31 the XPS survey analysis is shown. No peaks from the sample substrate is observed concluding that a polymer brush thickness above 10 nm is achieved (10 nm is the detection limit of the XPS). The chemical composition of the PHEMA polymer brush was confirmed by XPS (FIG. 31). Importantly, the peaks at 535 and 287 eV confirm the presence of oxygen and carbon, respectively. The atom percentage of 69.0% for oxygen and 31.0% for carbon is in coherence with the theoretical values. In FIG. 32, a high-resolution spectrum of the carbon peak is shown, verifying the chemical structure of the PHEMA polymer brush.

The invention claimed is:

1. A method for forming polymer brushes on a surface, wherein a surface having polymerisation initiators immobilised thereon is brought into contact with a polymer gel swelled in a polymerisation medium, wherein the polymer gel is removable from the surface after formation of the polymer brushes on the surface.

2. The method according to claim 1, wherein the polymer gel is swellable in water, in a mixture of water and an alcohol, in a mixture of water and an aprotic solvent, or in an aprotic solvent.

3. The method according to claim 1, wherein a cross-linking of the polymer gel is reversible.

4. The method according to claim 1, wherein the polymer gel is polyallylamine (PAH)/tannic acid (TA)/Fe(III), chitosan/TA/Fe(III), collagen/TA/Fe(III), polyvinyl imidiazole, poly(phosphoric acid 2-hydroxyethyl methacrylate ester), or polysaccharides.

5. The method according to claim 1, wherein the polymer gel has metal chelating sites.

6. The method according to claim 1, wherein the polymer gel is removable by adjustment of pH or temperature, by light exposure, or by sonication.

7. The method according to claim 4, wherein the polysaccharides are selected from the group consisting of sodium alginate, xanthan gum, and cyclodextrins.

8. The method according to claim 1, wherein the polymerisation medium comprises a solvent or combination of solvents, monomers, a ligand, a catalyst, or an activator.

9. The method according to claim 1, wherein the polymer brushes are synthesised by Surface-Initiated Polymerisation.

10. A method for forming polymer brushes on a surface, comprising:
    immobilising polymerisation initiators onto a surface, and
    bringing the surface into contact with a polymer gel swelled in a polymerisation medium to form polymer brushes on the surface,
    wherein the polymer gel is removable from the surface after formation of the polymer brushes on the surface.

11. The method according to claim 10, wherein the polymerisation medium comprises a solvent or combination of solvents, monomers, a ligand, a catalyst, and/or an activator.

12. The method according to claim 10, wherein a cross-linking of the polymer gel is reversible.

13. The method according to claim 10, wherein the polymer gel is polyallylamine (PAH)/tannic acid (TA)/Fe (III), chitosan/TA/Fe(III), collagen/TA/Fe(III), polyvinyl imidiazole, poly(phosphoric acid 2-hydroxyethyl methacrylate ester), or polysaccharides.

14. The method according to claim 13, wherein the polysaccharides are selected from the group consisting of sodium alginate, xanthan gum, and cyclodextrins.

15. The method according to claim 10, wherein the polymer gel has metal chelating sites.

16. The method of claim 10, wherein after formation of the polymer brushes, the polymer gel is removed from the surface.

17. The method according to claim 10, wherein the swelled polymer gel is removable by adjustment of pH or temperature, by light exposure, or by sonication.

18. The method according to claim 10, wherein the bringing of the surface into contact with the polymer gel swelled in the polymerisation medium comprises evenly distributing the polymerisation medium on the surface.

* * * * *